United States Patent
Mukae

(10) Patent No.: US 12,057,001 B2
(45) Date of Patent: *Aug. 6, 2024

(54) SPACE OBJECT INTRUSION ALERT DEVICE, SPACE OBJECT INTRUSION ALERT METHOD, COMPUTER READABLE MEDIUM, SATELLITE CONSTELLATION FORMING SYSTEM, DEBRIS REMOVAL SATELLITE, GROUND FACILITY, AND SPACE OBJECT INTRUSION ALERT SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 17/641,816

(22) PCT Filed: Sep. 25, 2020

(86) PCT No.: PCT/JP2020/036344
§ 371 (c)(1),
(2) Date: Mar. 10, 2022

(87) PCT Pub. No.: WO2021/065734
PCT Pub. Date: Apr. 8, 2021

(65) Prior Publication Data
US 2022/0327906 A1  Oct. 13, 2022

(30) Foreign Application Priority Data

Oct. 1, 2019  (JP) .................................. 2019-181712

(51) Int. Cl.
*G08B 21/18* (2006.01)
*B64G 1/10* (2006.01)
(Continued)

(52) U.S. Cl.
CPC ........... *G08B 21/18* (2013.01); *B64G 1/1078* (2013.01); *B64G 1/242* (2013.01); *G06Q 10/06311* (2013.01)

(58) Field of Classification Search
CPC ........ G08B 21/18; B64G 1/1085; B64G 1/68; B64G 1/242; B64G 1/56; B64G 1/66
See application file for complete search history.

(56) References Cited

U.S. PATENT DOCUMENTS 9,546,007 B2 * 1/2017 Comtesse .............. B64G 1/002
2006/0026017 A1 * 2/2006 Walker .................. H04L 63/302
701/31.4
(Continued)

FOREIGN PATENT DOCUMENTS

JP  2017-114159 A  6/2017

OTHER PUBLICATIONS

Partial European Search Report issued Oct. 18, 2022 in corresponding European Patent Application No. 20872322.1, 12 pages.
(Continued)

*Primary Examiner* — Mirza F Alam
(74) *Attorney, Agent, or Firm* — XSENSUS LLP

(57) ABSTRACT

An object is to notify an appropriate intrusion alert by determining whether debris will intrude into an orbit area of a satellite constellation. A passage determination unit (110) determines whether debris will pass through a satellite orbit area, based on satellite orbit forecast information in which a forecast value of an orbit of a satellite is set and debris orbit forecast information in which a forecast value of an orbit of debris is set. When it is determined that debris will pass through the satellite orbit area, an alert generation unit (120) generates an intrusion alert (111) including a predicted time, predicted location coordinates, and predicted velocity vector information that relate to passage of the debris. An alert notification unit (130) notifies the intrusion alert (111) to a management business device (40) used by a management business operator that manages a satellite that flies in the satellite orbit area.

28 Claims, 19 Drawing Sheets

(51) Int. Cl.
    *B64G 1/24* (2006.01)
    *G06Q 10/0631* (2023.01)

(56) References Cited

U.S. PATENT DOCUMENTS

| | | | |
|---|---|---|---|
| 2011/0226907 A1* | 9/2011 | Robinson | B64G 1/1085 244/158.4 |
| 2016/0188176 A1 | 6/2016 | Runnels | |
| 2018/0268605 A1 | 9/2018 | Jia et al. | |
| 2018/0346153 A1* | 12/2018 | Kaplan | B64G 1/242 |
| 2018/0370658 A1 | 12/2018 | Amimoto et al. | |
| 2019/0248516 A1 | 8/2019 | Kaplan | |
| 2023/0211896 A1* | 7/2023 | Gegout | B64G 1/68 701/301 |

OTHER PUBLICATIONS

Extended European Search Report issued Jan. 25, 2023 in corresponding European Patent Application No. 20872322.1, 12 pages.
International Search Report and Written Opinion mailed on Dec. 15, 2020, received for PCT Application PCT/JP2020/036344, Filed on Sep. 25, 2020, 6 pages including English Translation.

* cited by examiner

Fig.10

51: ORBIT FORECAST INFORMATION
512: FORECAST EPOCH
513: FORECAST ORBITAL ELEMENTS
514: FORECAST ERROR
52: SATELLITE ORBIT FORECAST INFORMATION
53: DEBRIS ORBIT FORECAST INFORMATION
511 SPACE OBJECT ID

| SATELLITE ID | DEBRIS ID | Epoch | SIX KEPLERIAN ELEMENTS ||||||| PREDICTED ERROR |||
| --- | --- | --- | --- | --- | --- | --- | --- | --- | --- | --- | --- | --- |
| | | | Mean Motion | Eccentricity | Inclination | RAAN | Argument of Perigee | Mean Anomaly | TRAVELING DIRECTION | ORTHOGONAL DIRECTION | BASIS |
| | | Year and date | Orbits /day | No unit | deg | deg | deg | deg | km | km | |
| A | | a1 | a2 | a3 | a4 | a5 | a6 | a7 | a8 | a9 | IN-ORBIT MEASUREMENT |
| B | | b1 | b2 | b3 | b4 | b5 | b6 | b7 | b8 | b9 | IN-ORBIT MEASUREMENT |
| C | | c1 | c2 | c3 | c4 | c5 | c6 | c7 | c8 | c9 | ANALYSIS |
| D | | d1 | d2 | d3 | d4 | d5 | d6 | d7 | d8 | d9 | GROUND MEASUREMENT |
| E | | e1 | e2 | e3 | e4 | e5 | e6 | e7 | e8 | e9 | GROUND MEASUREMENT |
| F | | f1 | f2 | f3 | f4 | f5 | f6 | f7 | f8 | f9 | SSA MEASUREMENT |
| | A | α1 | α2 | α3 | α4 | α5 | α6 | α7 | α8 | α9 | SSA MEASUREMENT |
| | B | β1 | β2 | β3 | β4 | β5 | β6 | β7 | β8 | β9 | SSA MEASUREMENT |
| | Γ | γ1 | γ2 | γ3 | γ4 | γ5 | γ6 | γ7 | γ8 | γ9 | SSA MEASUREMENT |
| | Δ | δ1 | δ2 | δ3 | δ4 | δ5 | δ6 | δ7 | δ8 | δ9 | SSA MEASUREMENT |

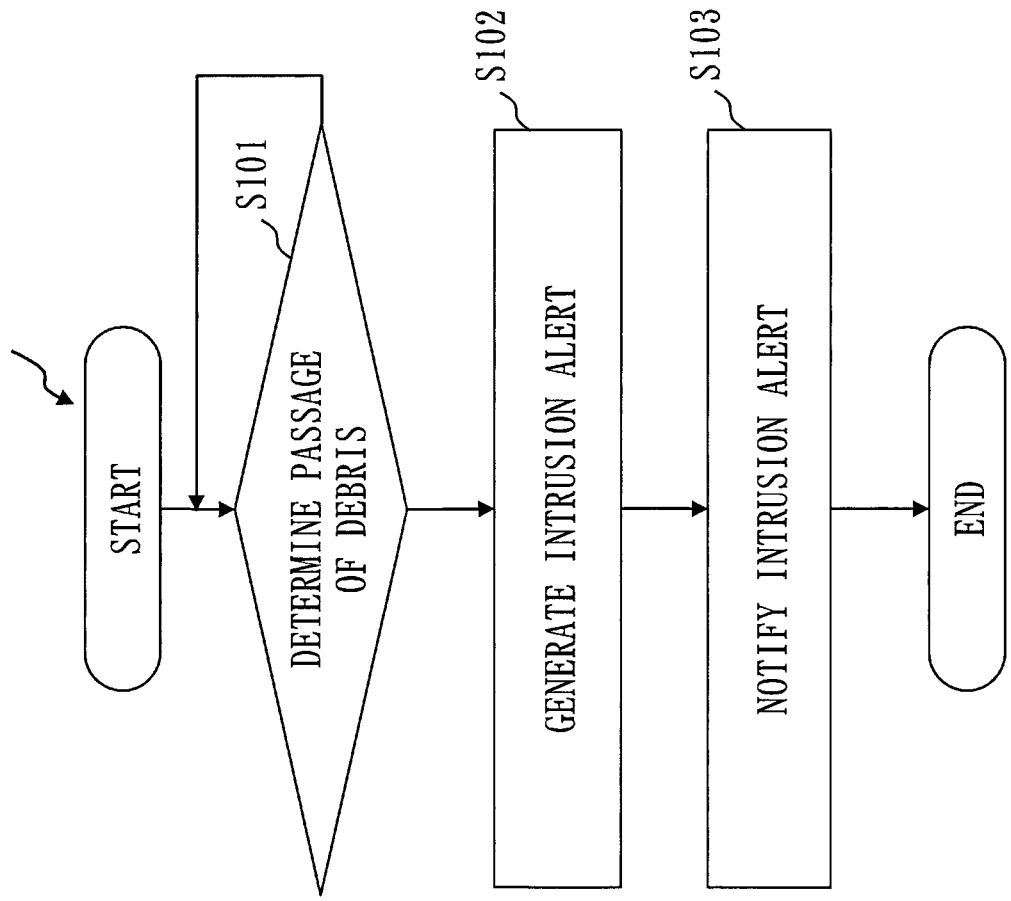

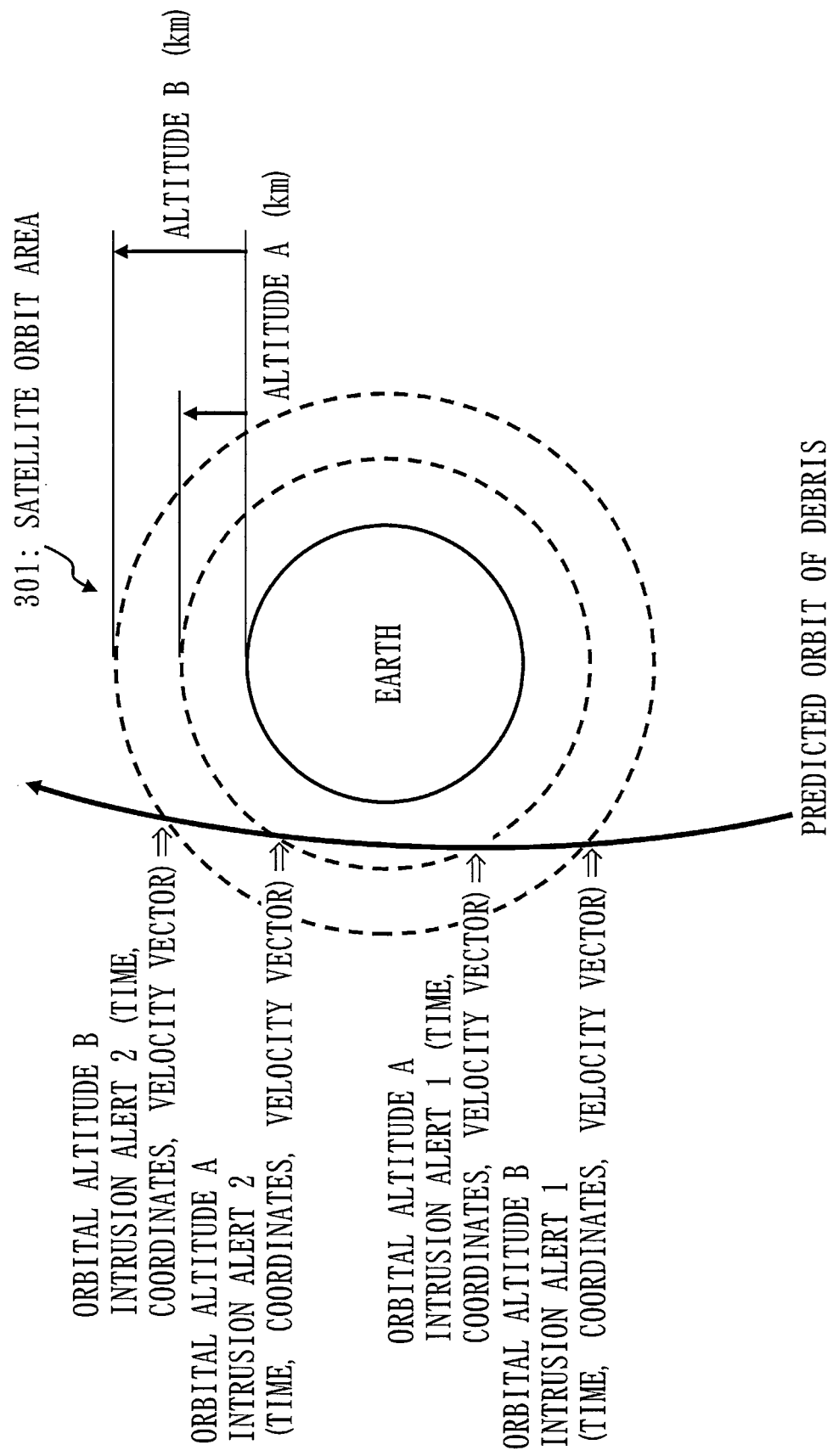

SPACE OBJECT INTRUSION ALERT DEVICE, SPACE OBJECT INTRUSION ALERT METHOD, COMPUTER READABLE MEDIUM, SATELLITE CONSTELLATION FORMING SYSTEM, DEBRIS REMOVAL SATELLITE, GROUND FACILITY, AND SPACE OBJECT INTRUSION ALERT SYSTEM

CROSS-REFERENCE TO RELATED APPLICATIONS

The present application is based on PCT filing PCT/JP2020/036344, filed Sep. 25, 2020, which claims priority to JP 2019-181712, filed Oct. 1, 2019, the entire contents of each are incorporated herein by reference.

TECHNICAL FIELD

The present invention relates to a space object intrusion alert device, a space object intrusion alert method, a space object intrusion alert program, a satellite constellation forming system, a debris removal satellite, a ground facility, and a space object intrusion alert system.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

There is now a system in which the Combined Space Operations Center (CSpOC) in the United States continues to monitor space objects and issues an alert when proximity or a collision between space objects is foreseen. At manned space stations and in commercial communications satellites, an avoidance operation is performed in response to this alert when it is judged necessary.

CITATION LIST

Patent Literature

Patent Literature 1: JP 2017-114159 A

SUMMARY OF INVENTION

Technical Problem

With an increase in debris in outer space, an increase in the number of satellites due to the emergence of mega-constellations, and improvement in ground surveillance capability, it is becoming difficult to continue the existing alert issuance service by the CSpOC in the United States. Space situation awareness (SSA) is required to judge whether debris will intrude into a satellite constellation.

However, Patent Literature 1 does not describe a method for foreseeing that debris will intrude into a satellite constellation.

An object of the present invention is to notify an appropriate intrusion alert by determining whether debris will intrude into an orbit area of a satellite constellation.

Solution to Problem

A space object intrusion alert device according to the present invention includes
  a passage determination unit to determine whether debris will pass through a satellite orbit area, which is an orbit or an area in which a plurality of satellites constituting a satellite constellation fly, based on satellite orbit forecast information in which a forecast value of an orbit of a satellite is set and debris orbit forecast information in which a forecast value of an orbit of debris is set;
  an alert generation unit to generate an intrusion alert when it is determined that debris will pass through the satellite orbit area, the intrusion alert including a predicted time, predicted location coordinates, and predicted velocity vector information that relate to passage of the debris; and
  an alert notification unit to notify the intrusion alert to a management business device used by a management business operator that manages a satellite that flies in the satellite orbit area.

Advantageous Effects of Invention

A space object intrusion alert device according to the present invention has the effect of being able to determine whether debris will intrude into an orbit area of a satellite constellation and notify an appropriate intrusion alert.

BRIEF DESCRIPTION OF DRAWINGS

FIG. 10 is an example of orbit forecast information according to Embodiment 1;

FIG. 11 is a flowchart of a space object intrusion alert process by the space object intrusion alert device according to Embodiment 1;

FIG. 12 is an example of a predicted orbit of and an intrusion alert for debris that will pass through a satellite constellation according to Embodiment 1;

DESCRIPTION OF EMBODIMENTS

Figure 1:
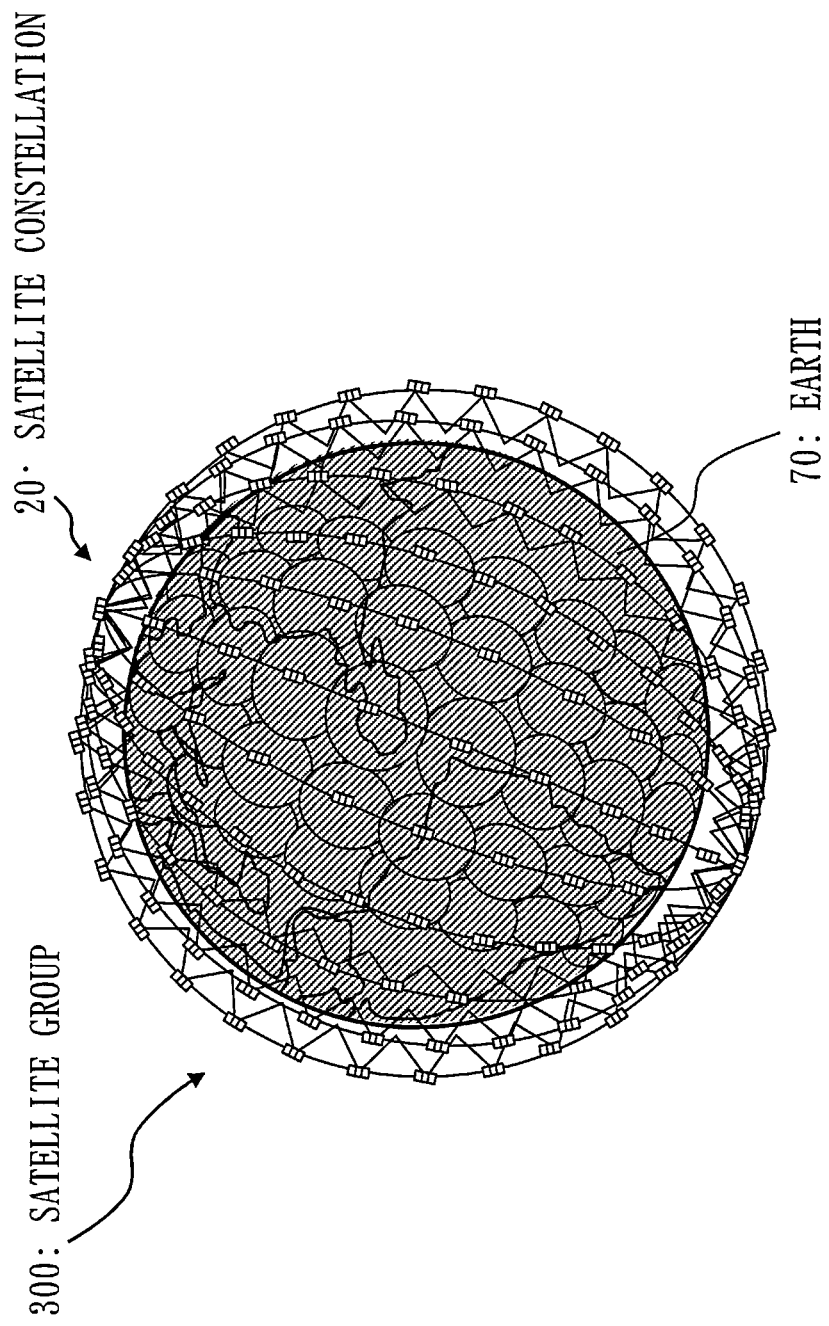
FIG. 1 is an example in which a plurality of satellites cooperatively realize a communication service to the ground over the entire globe of Earth.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation, which is assumed for a space object intrusion alert system according to the following embodiments, will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
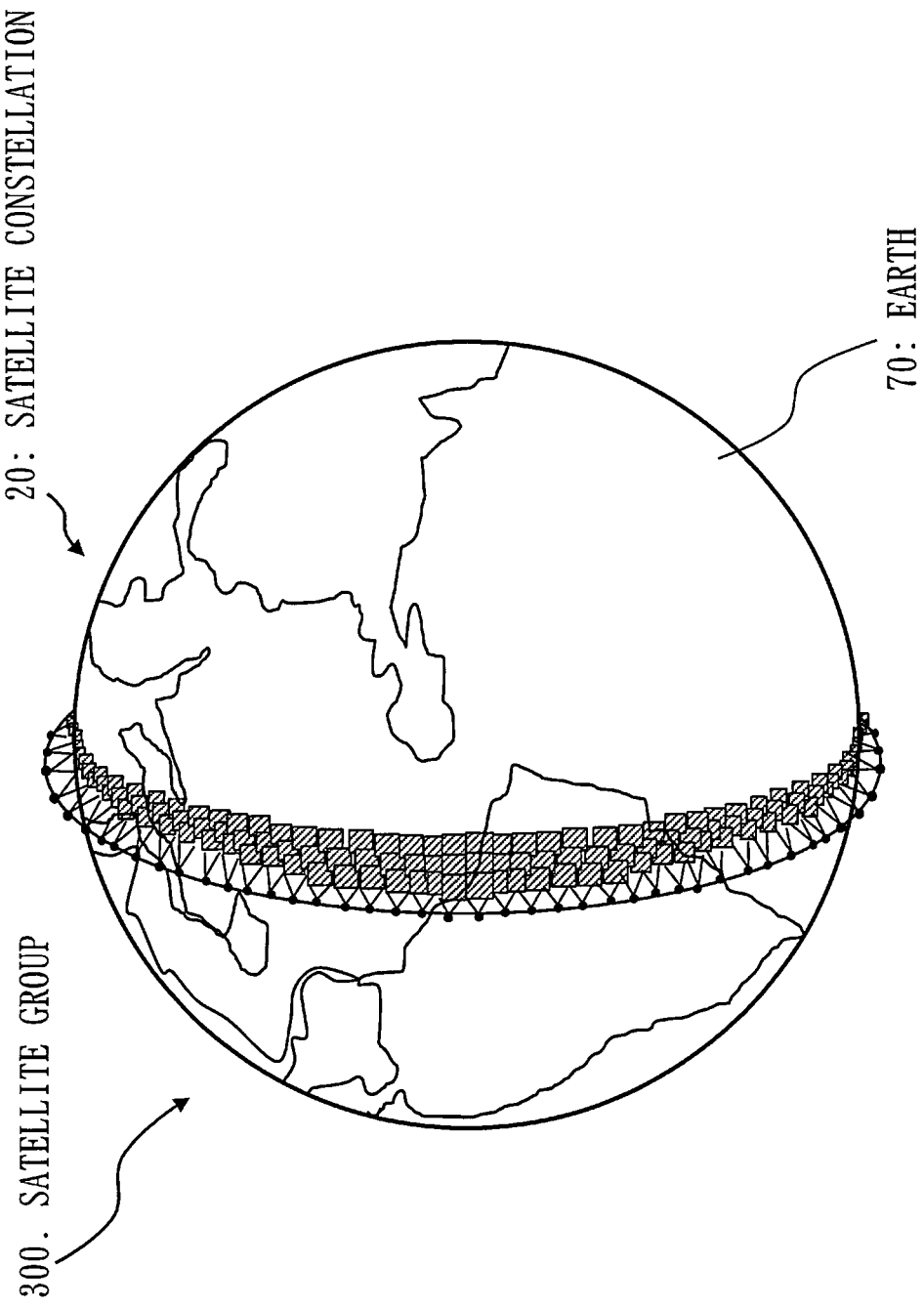
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications service company as illustrated in FIG. 1 or an observation service company as illustrated in FIG. 2.

Figure 3:
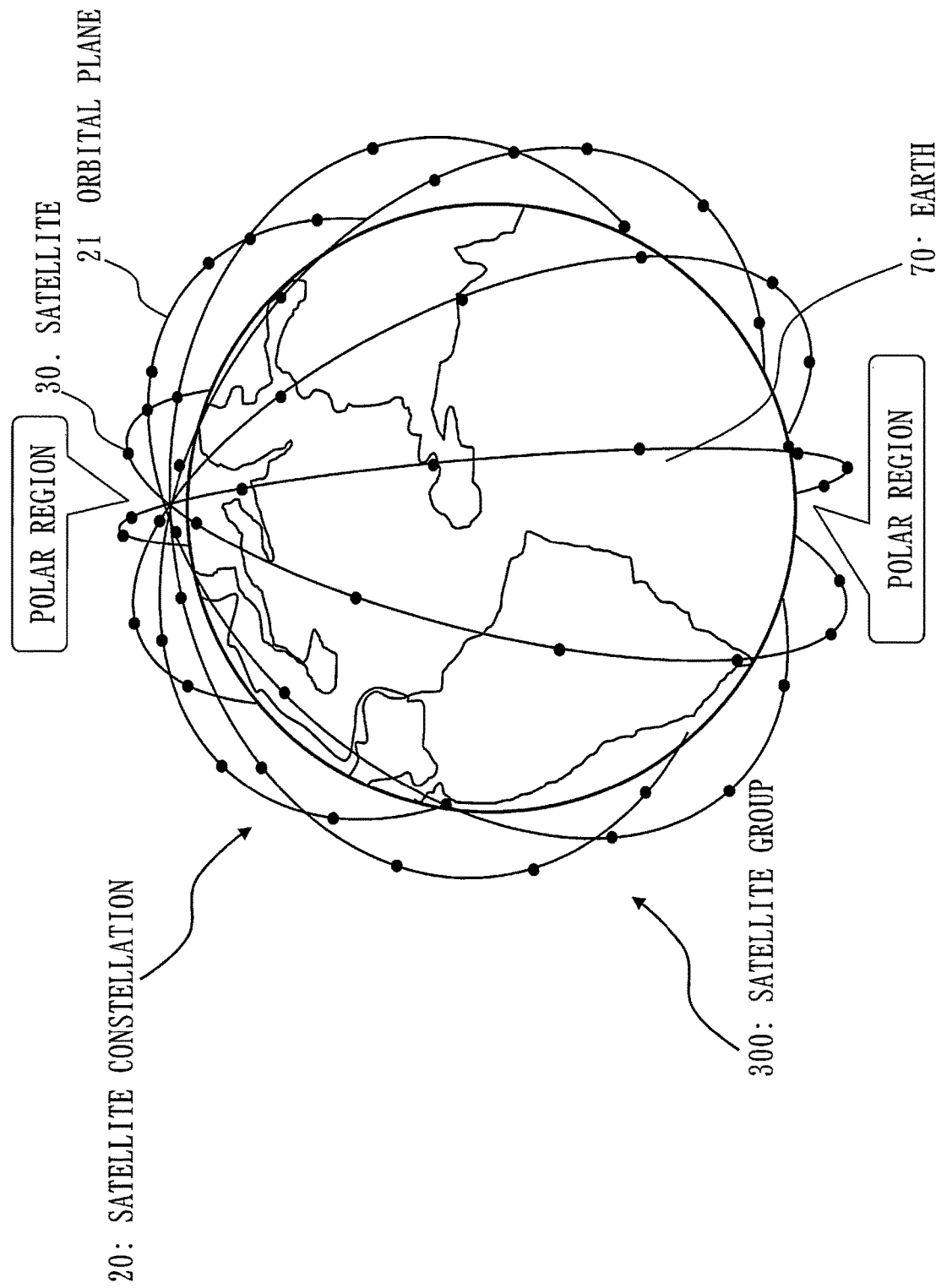
FIG. 3 is an example of a satellite constellation having a plurality of orbital planes that intersect in the vicinity of the polar regions.
Figure 4:
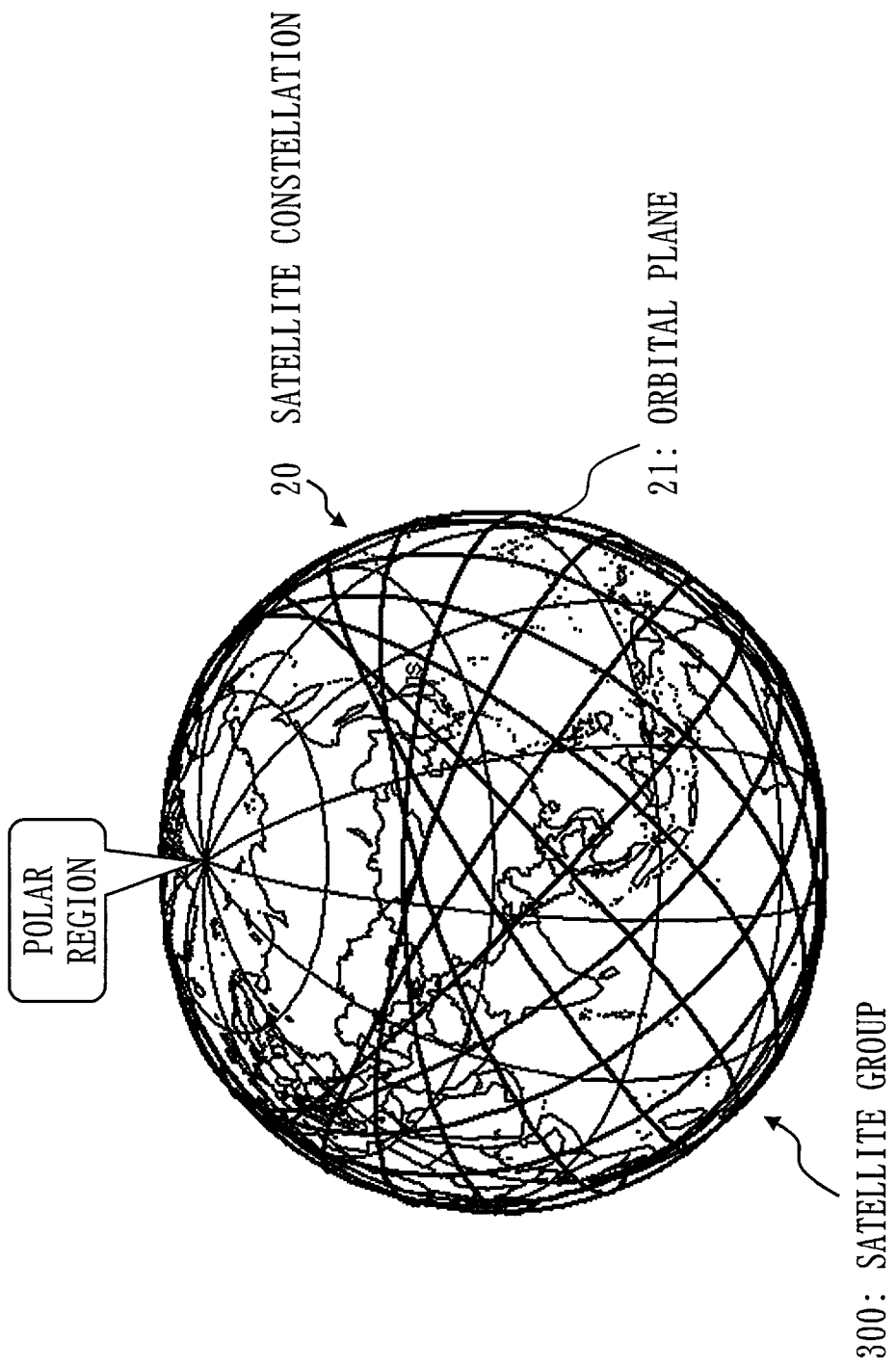
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In particular, in recent years, large-scale satellite constellations including several hundred to several thousand satellites have started to be constructed, and the risk of collision accidents between satellites in orbit is increasing. In addition, space debris such as an artificial satellite that has become uncontrollable due to a failure or rocket debris has been increasing. A large-scale satellite constellation is also called a mega-constellation. Such debris is also called space debris.

As described above, with the increase in debris in outer space and the rapid increase in the number of satellites such as those in a mega-constellation, the need for space traffic management (STM) is increasing.

For orbital transfer of a space object, there has been increasing need for deorbit after completion of a mission in orbit (PMD), or ADR, which causes debris such as a failed satellite or an upper stage of a rocket that is floating to deorbit by external means such as a debris removal satellite. International discussions have begun as STM on the need for such ADR. PMD is an abbreviation for Post Mission Disposal. ADR is an abbreviation for Active Debris Removal. STM is an abbreviation for Space Traffic Management.

With the enhanced system including international cooperation in space situation awareness (SSA) and improvement of measurement precision, it has become possible to recognize and monitor space objects of smaller sizes. The total number of space objects that can be monitored is also increasing.

A dramatic increase in the number of space objects due to the construction of mega-constellations is one of causes for increasing risks of collision in outer space. However, assuming that collisions between artificial space objects can be avoided as an effect of artificial activities such as STM, a risk of chain-reaction collision triggered by a collision with debris floating in outer space is still a serious problem.

Even if the debris itself is a minute object, there is a risk that a satellite will be damaged explosively under collision conditions with a high relative velocity, and there is a risk of chain-reaction higher damage caused by scattered pieces of the debris.

As a mega-constellation of a few thousand satellites, a plan of making about 2500 satellites fly at the same altitude has been announced. In steady operation, the mainstream policy is to avoid collisions within a system by performing time management on the flight positions of all satellites. However, if a collision with debris triggers an anomaly to occur in orbital attitude control of one satellite, resulting in deviation from control according to the initial time management, or if pieces of debris scatter, there is a very high risk of collision with other satellites flying in the same orbital plane.

In order to avoid such a risk of collision, it is rational to manage orbit information of debris and orbit information of a mega-constellation in an integrated manner and perform collision prediction analysis. It is said that debris information of about 20,000 pieces of basketball-sized debris can be monitored in the SSA area. Furthermore, it is said that 200,000 pieces of softball-sized debris can be monitored in the future with improvement in surveillance capability called the Space Fence by the United States.

If the SSA business operator maintains and manages debris information of 200,000 pieces of debris while updating the information, there are many problems in further managing, in an integrated manner, orbit information of 10,000 or more satellites owned by a mega-constellation business operator. For example, when not only orbit prediction based on natural phenomena but also orbital attitude control provided in each satellite is used, its effect needs to be reflected in orbit prediction analysis, which entails a huge amount of work. The mega-constellation business operator may not always disclose the latest and highly precise satellite information to the SSA business operator. The monitoring of 200,000 pieces of debris is by no means a necessary and sufficient scale. Even a minute piece of debris smaller than a softball can have enough potential to destroy a satellite. Therefore, the need to monitor a huge amount of debris of smaller sizes will increase in the future.

It is not realistic for the mega-constellation business operator to perform integrated management including information on nearly 200,000 pieces of debris from the viewpoint of workload and so on. Furthermore, it is not easy to consolidate information of multiple mega-constellation business operators in an integrated manner.

Under the circumstances as described above, it is preferable that the SSA business operator passes debris orbit information to the mega-constellation business operator, and the mega-constellation business operator performs analysis on collisions with satellites in its own system. In a mega-constellation, several thousand satellites fly at a specific orbital altitude. Therefore, if a predicted time, a location, and velocity vector information that relate to passage through the specific orbital altitude at which the mega-constellation operates are provided as debris orbit information, the mega-constellation business operator can identify satellites with a risk of collision and perform collision prediction analysis.

Referring to FIGS. 5 to 8, an example of a satellite 30 and a ground facility 700 in a satellite constellation forming system 600 that forms a satellite constellation 20 will now be described. For example, the satellite constellation forming system 600 is operated by a business operator that conducts a satellite constellation business, such as a mega-constellation business device 41, an LEO constellation business device 42, or a satellite business device 43.

Figure 5:
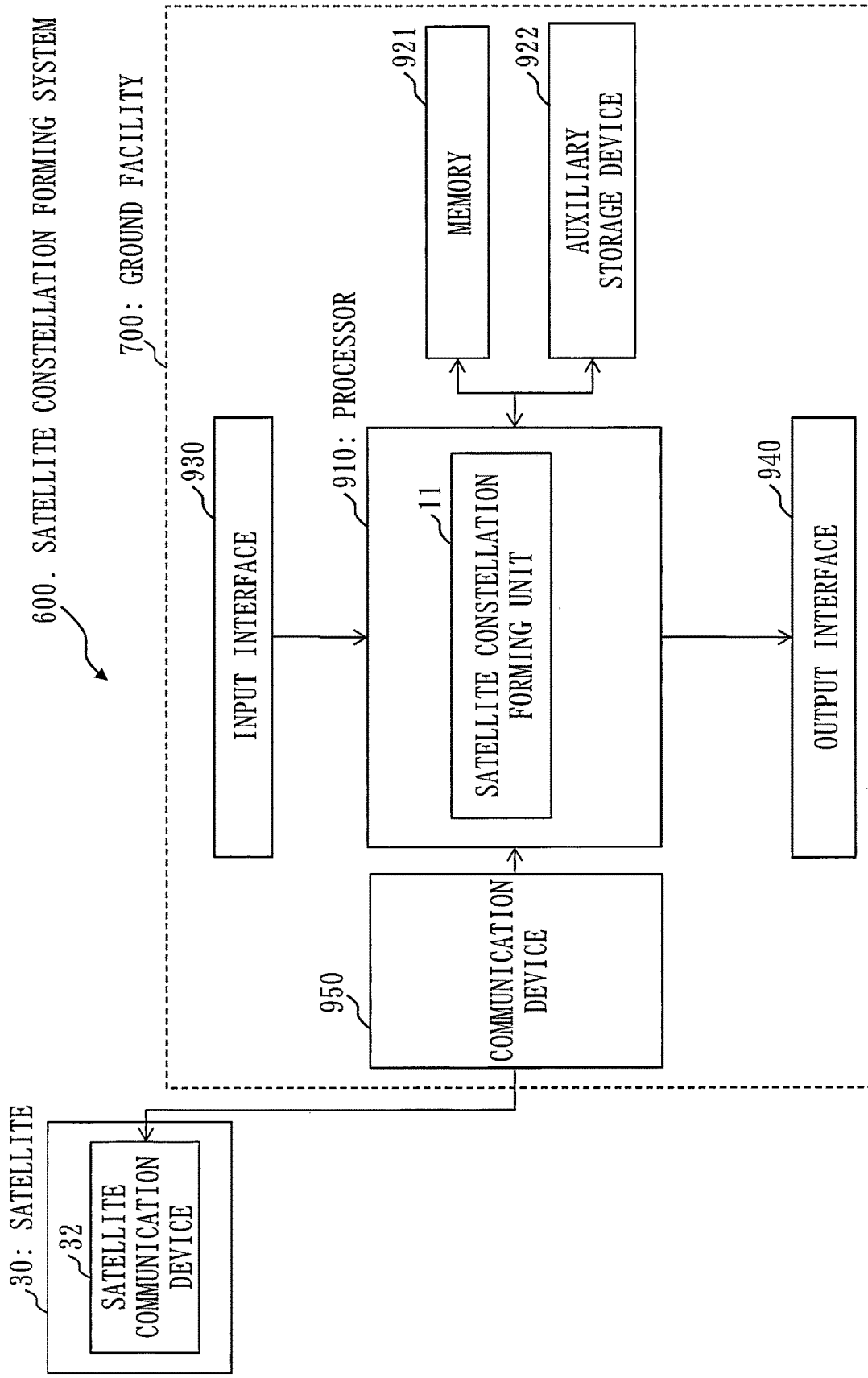
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of a space object intrusion alert device 100 to be described later with reference to FIG. 9.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
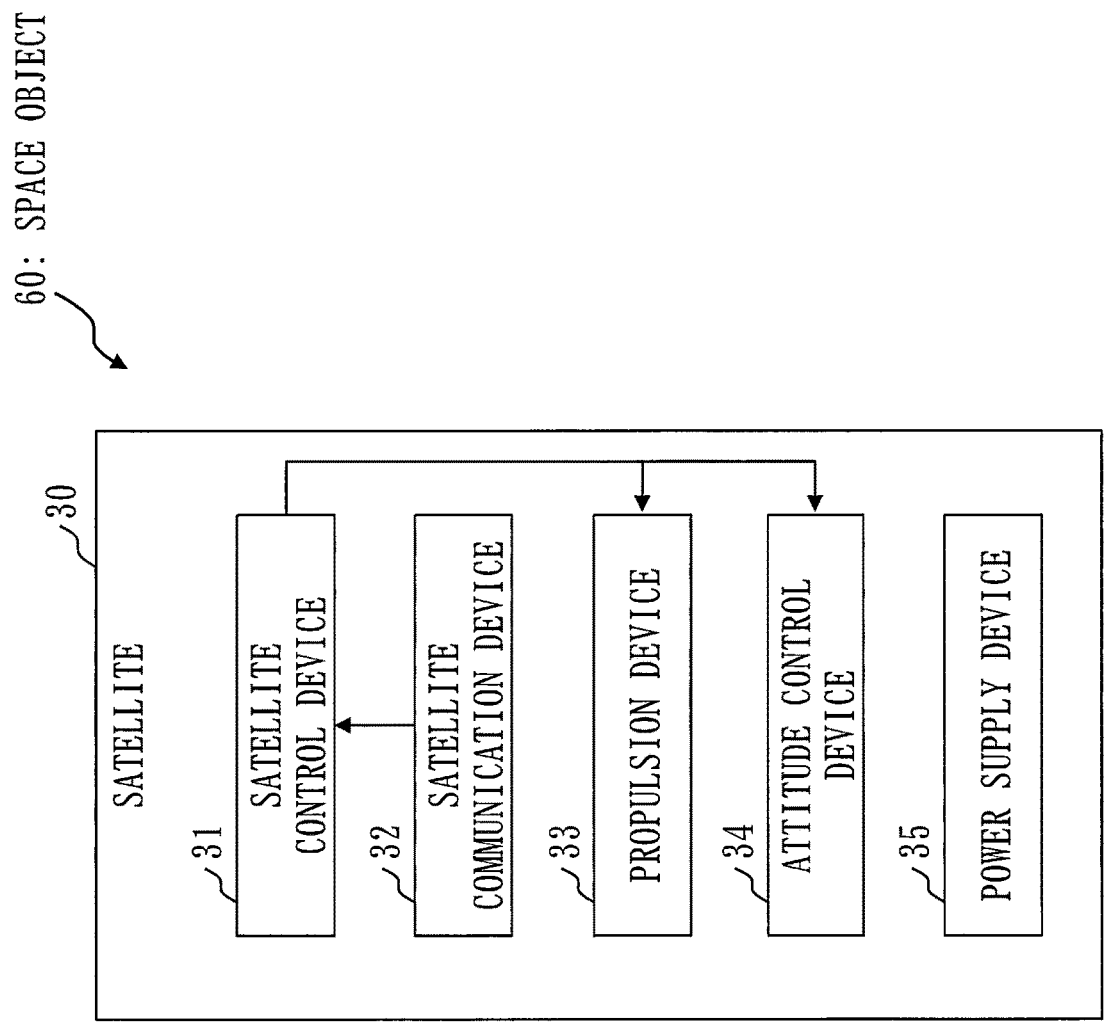
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, a satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an apogee kick motor, a chemical propulsion device, or an electric propulsion device. The apogee keck motor (AKM) is an upper-stage propulsion device used for orbital insertion of an artificial satellite, and is also called an apogee motor (when a solid rocket motor is used) or an apogee engine (when a liquid engine is used).

The chemical propulsion device is a thruster using monopropellant or bipropellant fuel. The electric propulsion device is an ion engine or a Hall thruster. The apogee kick motor is the name of a device used for orbital transfer and may be a type of chemical propulsion device.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
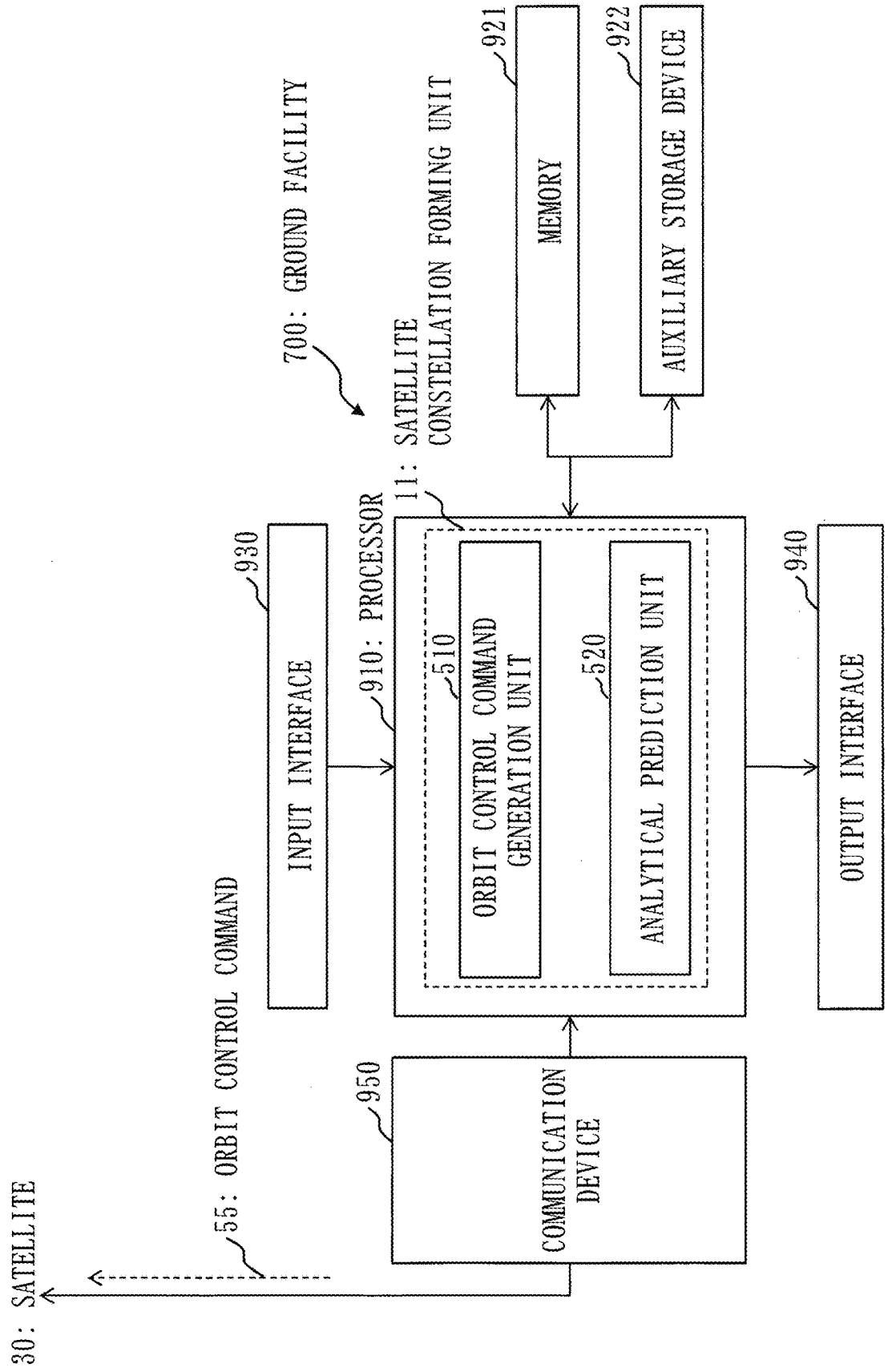
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 is provided in the space object intrusion alert device 100. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 are substantially the same as the hardware components of the space object intrusion alert device 100 to be described later with reference to FIG. 9.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
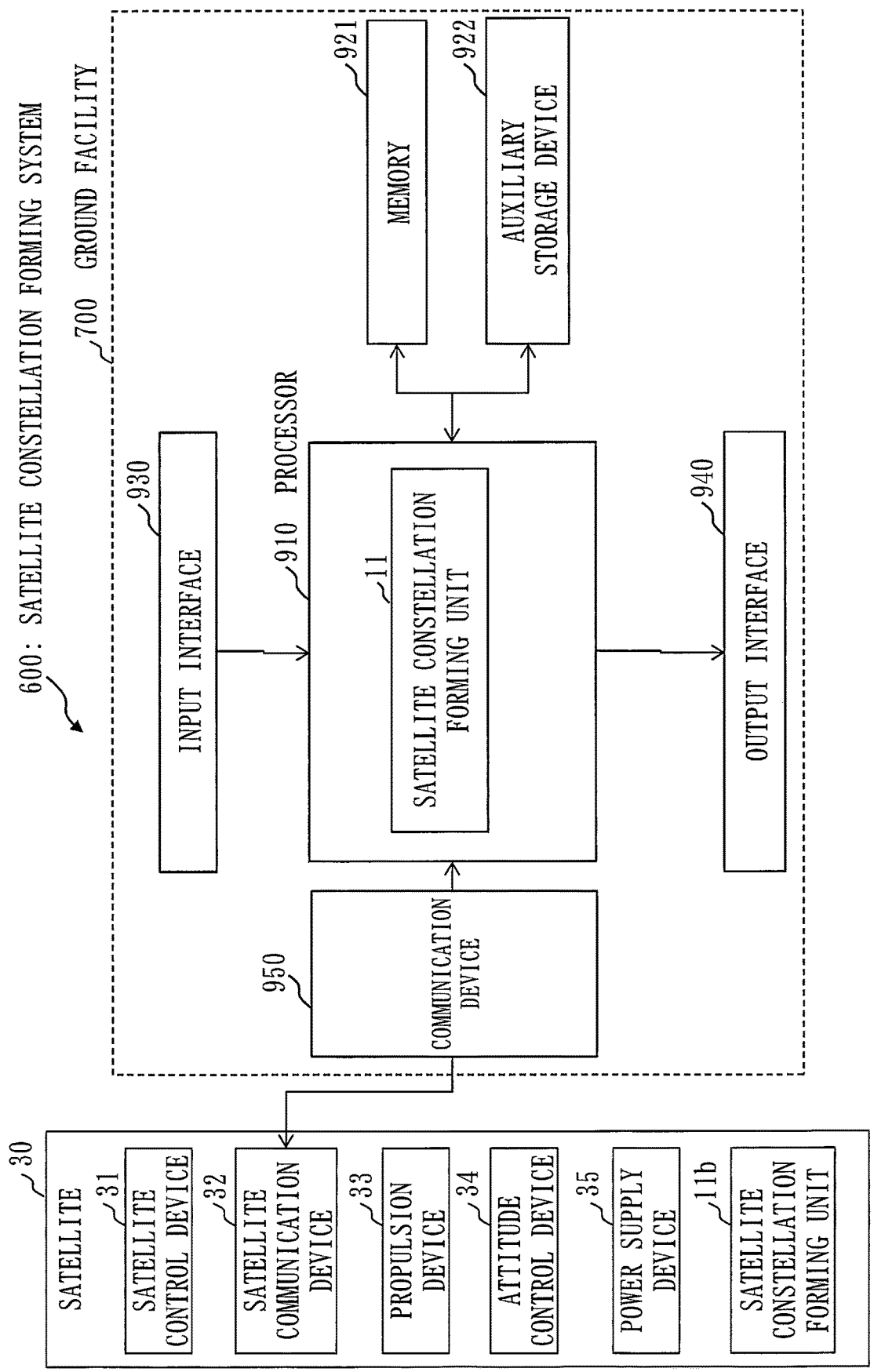
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

*Description of Configurations*

Figure 9:
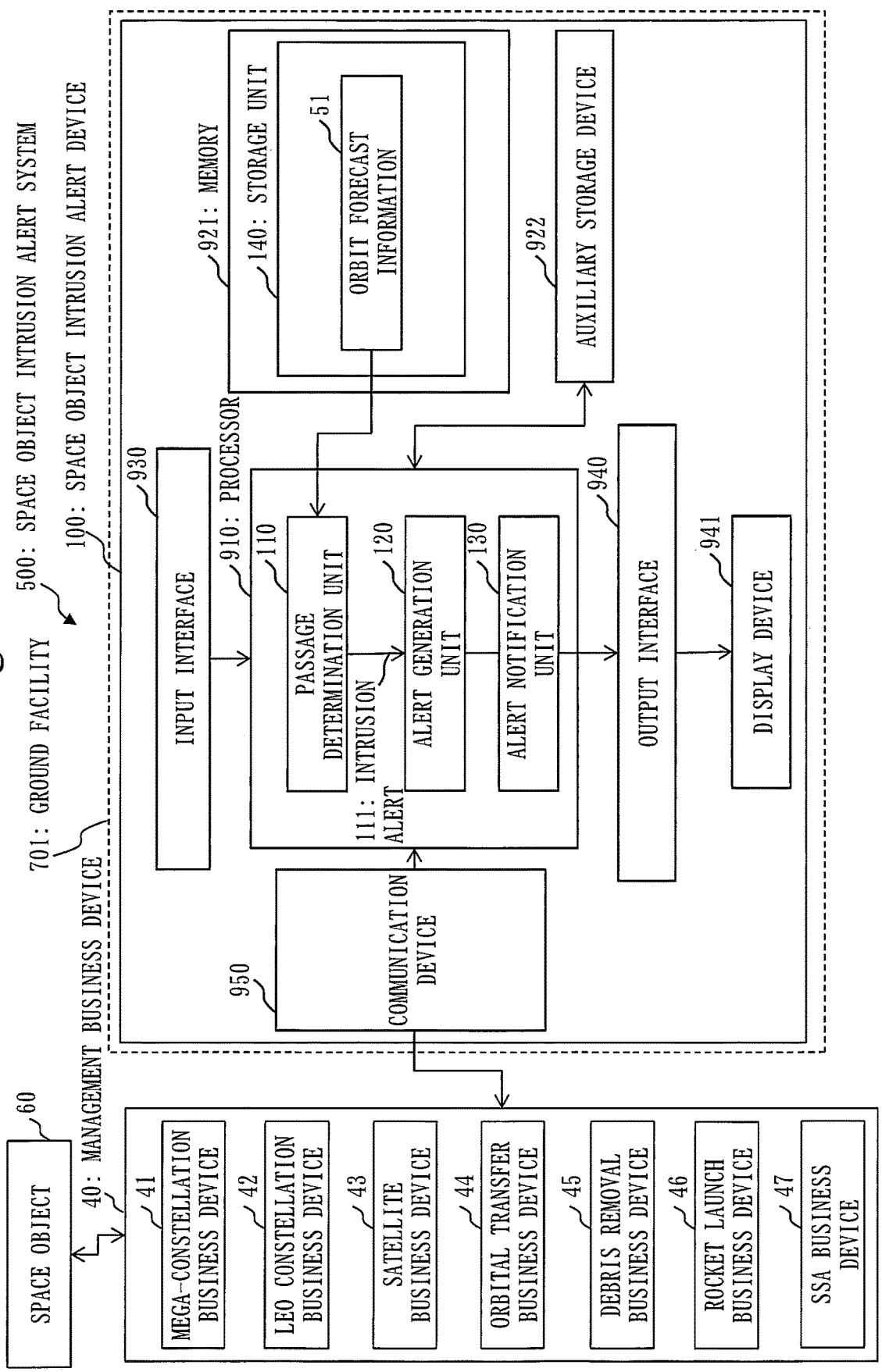
FIG. 9 is a configuration diagram of a space object intrusion alert device according to Embodiment 1.

FIG. 9 is a configuration diagram of the space object intrusion alert device 100 according to this embodiment.

A space object intrusion alert system 500 includes the space object intrusion alert device 100.

The space object intrusion alert device 100 communicates with a management business device 40. The space object intrusion alert device 100 may be installed in a ground facility 701. The space object intrusion alert device 100 may be installed in the satellite constellation forming system 600. Alternatively, the space object intrusion alert device 100 may be installed in at least one management business device 40 such as an SSA business device 47. Alternatively, the space object intrusion alert device 100 may be installed in an orbit analysis service business operator.

The management business device 40 provides information related to space objects 60 such as artificial satellites or debris. The management business device 40 is a computer of a business operator that collects information related to the space objects 60 such as artificial satellites or debris.

The management business device 40 includes devices such as the mega-constellation business device 41, the LEO constellation business device 42, the satellite business device 43, an orbital transfer business device 44, a debris removal business device 45, a rocket launch business device 46, and the SSA business device 47. LEO is an abbreviation for Low Earth Orbit.

The mega-constellation business device 41 is a computer of a mega-constellation business operator that operates a large-scale constellation, that is, mega-constellation business.

The LEO constellation business device 42 is a computer of an LEO constellation business operator that operates a low Earth orbit constellation, that is, LEO constellation business.

The satellite business device 43 is a computer of a satellite business operator that handles one to several satellites.

The orbital transfer business device 44 is a computer of an orbital transfer business operator that performs a space object intrusion alert for satellites.

The debris removal business device 45 is a computer of a debris removal business operator that conducts a business to retrieve debris.

The rocket launch business device 46 is a computer of a rocket launch business operator that conducts a rocket launch business.

The SSA business device 47 is a computer of an SSA business operator that conducts an SSA business, that is, a space situation awareness business.

The management business device 40 may be a device other than the above, provided that it is the device that collects information on space objects such as artificial satellites or debris, and provides the collected information to the space object intrusion alert device 100. When the space object intrusion alert device 100 is installed on an SSA public server, the space object intrusion alert device 100 may be configured to function as the SSA public server.

The information provided from the management business device 40 to the space object intrusion alert device 100 will be described in detail later.

The space object intrusion alert device 100 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The space object intrusion alert device 100 includes, as functional elements, a passage determination unit 110, an alert generation unit 120, an alert notification unit 130, and a storage unit 140. In the storage unit 140, orbit forecast information 51 is stored.

The functions of the passage determination unit 110, the alert generation unit 120, and the alert notification unit 130 are realized by software. The storage unit 140 is provided in the memory 921. Alternatively, the storage unit 140 may be provided in the auxiliary storage device 922. Alternatively, the storage unit 140 may be divided and provided in the memory 921 and the auxiliary storage device 922.

The processor 910 is a device that executes a space object intrusion alert program. The space object intrusion alert program is a program that realizes the functions of the passage determination unit 110, the alert generation unit 120, and the alert notification unit 130.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). The space object intrusion alert device 100 communicates with the management business device 40 via the communication device 950.

The space object intrusion alert program is read into the processor 910 and executed by the processor 910. The memory 921 stores not only the space object intrusion alert program but also an operating system (OS). The processor 910 executes the space object intrusion alert program while executing the OS. The space object intrusion alert program and the OS may be stored in the auxiliary storage device 922. The space object intrusion alert program and the OS that are stored in the auxiliary storage device 922 are loaded into the memory 921 and executed by the processor 910. Part or the entirety of the space object intrusion alert program may be embedded in the OS.

The space object intrusion alert device 100 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the space object intrusion alert system may be interpreted as "process", "procedure", "means", "phase", or "step". "Process" of the passage determination process, the alert generation process, and the alert notification process may be interpreted as "program", "program product", or "computer readable recording medium recording a program". The terms "process", "procedure", "means", "phase", and "step" may be interpreted interchangeably.

The space object intrusion alert program causes a computer to execute each process, each procedure, each means, each phase, or each step, where "unit" of each unit of the space object intrusion alert system is interpreted as "process", "procedure", "means", "phase", or "step". A space object intrusion alert method is a method performed by execution of the space object intrusion alert program by the space object intrusion alert device 100.

The space object intrusion alert program may be stored and provided in a computer readable recording medium. Alternatively, each program may be provided as a program product.

FIG. 10 is a diagram illustrating an example of the orbit forecast information 51 according to this embodiment.

The space object intrusion alert device 100 stores the orbit forecast information 51 in which forecast values of orbits of space objects 60 are set in the storage unit 140. For example, the space object intrusion alert device 100 may acquire forecast values of the orbit of each of the space objects 60 from the management business device 40 used by a management business operator that manages the space objects 60 and store them as the orbit forecast information 51. Alternatively, the space object intrusion alert device 100 may acquire the orbit forecast information 51 in which forecast values of the orbit of each of the space objects 60 are set from a management business operator and store it in the storage unit 140.

The management business operator is a business operator that manages the space objects 60 that fly in outer space, such as a satellite constellation, various types of satellites, a rocket, and debris. As described above, the management business device 40 used by each management business operator is a computer, such as the mega-constellation business device 41, the LEO constellation business device 42, the satellite business device 43, the orbital transfer business device 44, the debris removal business device 45, the rocket launch business device 46, and the SSA business device 47.

The orbit forecast information 51 includes satellite orbit forecast information 52 and debris orbit forecast information 53. In the satellite orbit forecast information 52, forecast values of orbits of satellites are set. In the debris orbit forecast information 53, forecast values of orbits of debris are set. In this embodiment, it is arranged that the satellite orbit forecast information 52 and the debris orbit forecast information 53 are included in the orbit forecast information 51. However, the satellite orbit forecast information 52 and the debris orbit forecast information 53 may be stored in the storage unit 140 as separate pieces of information.

In the orbit forecast information 51, information such as a space object identifier (ID) 511, a forecast epoch 512, forecast orbital elements 513, and a forecast error 514 are set.

The space object ID 511 is an identifier that identifies a space object 60. In FIG. 11, a satellite ID and a debris ID are set as the space object ID 511. Specifically, a space object is an object such as a rocket to be launched into outer space, an artificial satellite, a space station, a debris removal satellite, a planetary space probe, or a satellite or rocket that has become debris after completing a mission.

The forecast epoch 512 is an epoch that is forecast for the orbit of each of the space objects.

The forecast orbital elements 513 are orbital elements that identify the orbit of each of the space objects. The forecast orbital elements 513 are orbital elements that are forecast for the orbit of each of the space objects. In FIG. 11, the six Keplerian elements are set as the forecast orbital elements 513.

The forecast error 514 is an error that is forecast for the orbit of each of the space objects. In the forecast error 514, a traveling direction error, an orthogonal direction error, and a basis for the error are set. In this way, the forecast error 514 explicitly indicates the amount of error included in a record value together with the basis for the error. The basis for the error includes at least one or all of means for measurement, the content of data processing performed as means for improving the precision of location coordinate information, and a result of statistical evaluation on past data.

In the orbit forecast information 51 according to this embodiment, the forecast epoch 512 and the forecast orbital elements 513 are set for the space object 60. Using the forecast epoch 512 and the forecast orbital elements 513, the time and location coordinates of the space object 60 in the near future can be obtained. For example, the time and location coordinates of the space object 60 in the near future may be set in the orbit forecast information 51.

The orbit forecast information 51 thus includes information on the orbit of each space object including the epoch and orbital elements or the time and location coordinates, and explicitly indicates forecast values of the space object 60 in the near future.

*Description of Operation*

FIG. 11 is a flowchart of a space object intrusion alert process S100 by the space object intrusion alert device 100 according to this embodiment.

FIG. 12 is a diagram illustrating examples of a predicted orbit of debris that will pass through the satellite constellation 20 and an intrusion alert 111 according to this embodiment.

<Operation of the Space Object Intrusion Alert Process S100>

In step S101, the passage determination unit 110 determines whether debris will pass through a satellite orbit area 301, which is an orbit or an area where a plurality of satellites constituting the satellite constellation 20 fly, based on the satellite orbit forecast information 52 and the debris orbit forecast information 53. Specifically, the satellite orbit area 301 is an orbit where the satellite constellation 20 is formed. If it is determined that debris will pass through the satellite orbit area 301, the process proceeds to step S102. If it is not determined that debris will pass through a satellite orbit area, the process of step S101 is repeated.

In step S102, the alert generation unit 120 generates an intrusion alert 111 including a predicted time, predicted location coordinates, and predicted velocity vector information that relate to passage of the debris.

FIG. 12 illustrates a situation in which debris will pass through the satellite orbit area 301 where a satellite constellation A at an orbital altitude of A km and a satellite constellation B at an orbital altitude of B km are formed. The passage determination unit 110 determines whether a predicted orbit of debris will pass through a satellite constellation, based on the satellite orbit forecast information 52 and the debris orbit forecast information 53. In FIG. 12, an entrance to and an exit from the satellite constellation A and an entrance to and an exit from the satellite constellation B are passage points of the satellite constellation 20.

The alert generation unit 120 generates the intrusion alert 111 including a time, coordinates, and a velocity vector that are predicted for passage at each of these four passage points.

In step S103, the alert notification unit 130 notifies the intrusion alert 111 to the management business device 40 used by a management business operator that manages the satellites that fly in the satellite orbit area 301. Specifically, the alert notification unit notifies the intrusion alert to the satellite constellation business device used by the satellite constellation business operator that operates the satellite constellation. The satellite constellation business device is the business device of a business operator that conducts a satellite constellation business such as the mega-constellation business device 41, the LEO constellation business device 42, or the satellite business device 43.

Figure 13:
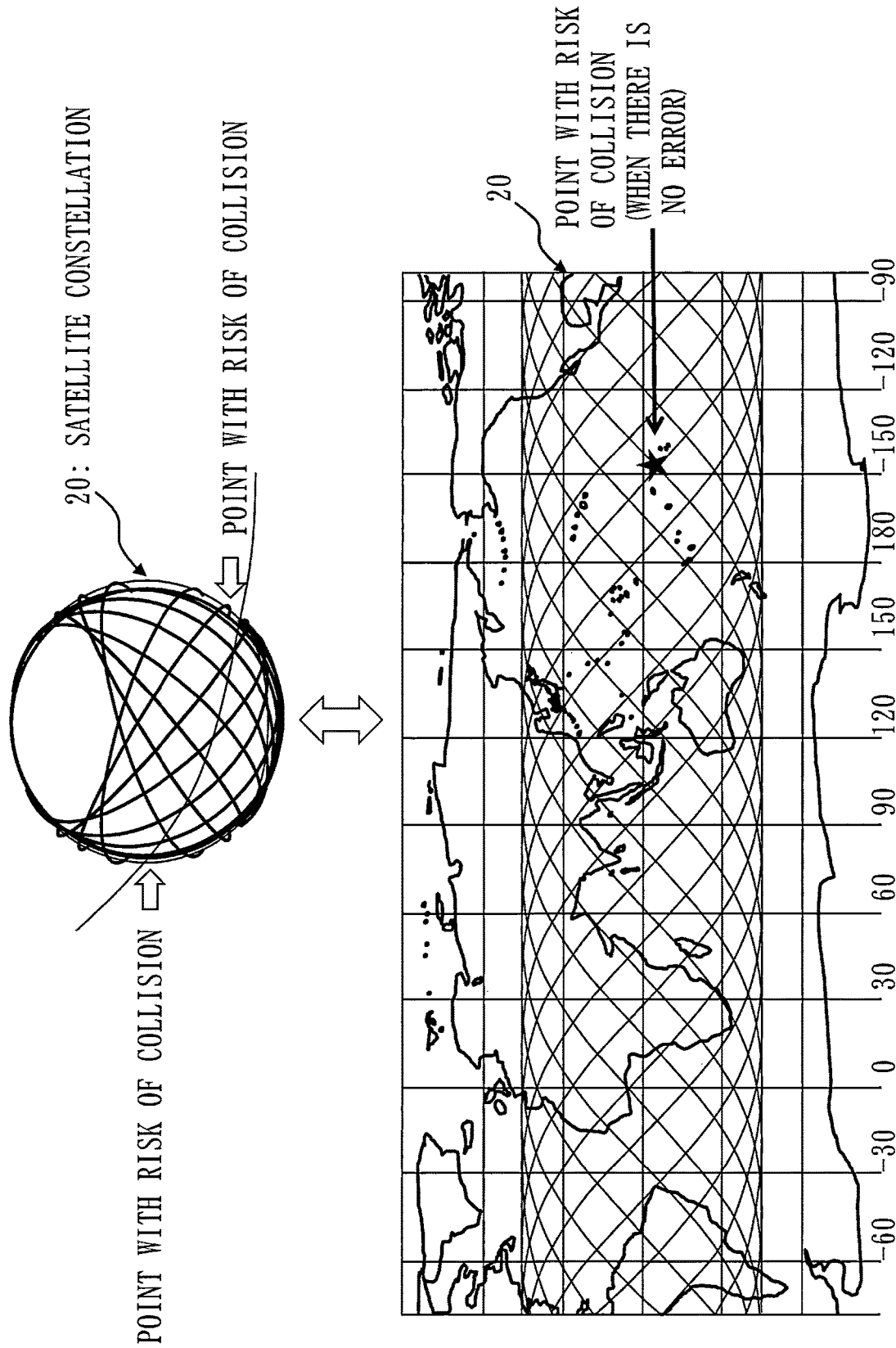
FIG. 13 is an example of a risk of collision between a satellite constellation and debris when there is no error.

FIG. 13 is a diagram illustrating an example of a risk of collision between the satellite constellation 20 and debris when there is no error.

Figure 14:
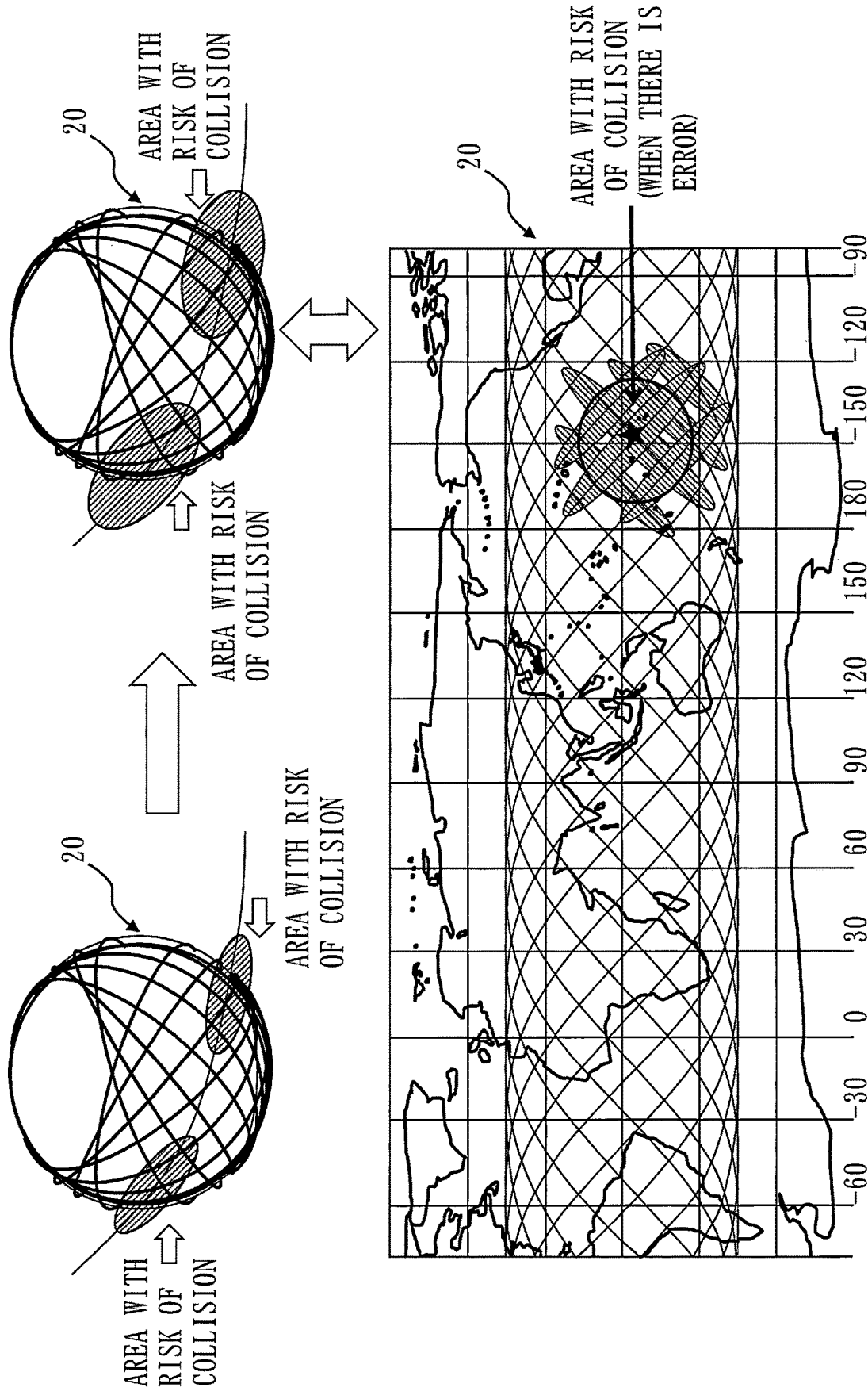
FIG. 14 is an example of a risk of collision between a satellite constellation and debris when there is an error.

FIG. 14 is a diagram illustrating a risk of collision between the satellite constellation 20 and debris according to this embodiment.

When a debris intrusion alert is to be issued for a satellite group of a mega-constellation, it is difficult for an alert issuer to distinguish between a proximity alert and a collision alert. The concept of a risk of collision and a risk of proximity in the mega-constellation will be described below.

Places where there is a risk of collision are limited to two places, which are an entrance and an exit when passing through a specific altitude. However, satellites with which a collision may occur are a large number of satellites flying in nearby orbits. If the predicted orbit of debris does not include an error and the orbital altitude at which satellites in the mega-constellation fly does not vary, points where there is a risk of collision can be identified and are limited to two points at an entrance and an exit.

In actuality, however, the predicted orbit of debris includes an error and the orbital altitude at which satellites in the mega-constellation fly varies or includes an error. Therefore, a risk of collision is not a point but has a spatial expanse as an area. In addition, a time error in the flight direction of debris is reduced to a spatial error with respect to the flying direction. Furthermore, on the mega-constellation side, satellites with a risk of collision increase as the flight distance expands depending on the time error.

There is a case in which a proximity alert is issued when proximity is within a relative distance of 100 km or less. An area expanded by approximately 100 km in addition to the prediction error becomes an "area where there is a risk of proximity", and applicable satellites on the mega-constellation side increase further.

Since a low Earth orbit satellite flies at about 7 km/sec to 10 km/sec, a time error of 10 seconds expands the area by approximately 100 km.

When a coordinate system such as the Earth fixed coordinate system WGS84 is employed, location coordinates can uniquely determine a location. However, the orbital plane of satellites in the mega-constellation moves relative to Earth from moment to moment. Therefore, only the mega-constellation business operator can strictly know the location of the orbital plane at a specific time. In addition, only the mega-constellation business operator has precise knowledge of locations where the satellites are flying in the orbital plane.

Therefore, when an SSA business operator that inherits the alert issuance service of the CSpOC in the United States emerges, it is sufficient that the SSA business operator issues a predicted time, predicted location coordinates, and a predicted velocity vector that relate to passage through the orbital altitude concerned to the mega-constellation business operator as an "alert". In this embodiment, this "alert" is called the "intrusion alert 111". It is a role of the satellite constellation business operator such as the mega-constellation business operator to receive the intrusion alert 111 and take an avoidance action.

<Collision Avoidance by the Satellite Constellation Forming System>

The satellite constellation forming system 600 described with reference to FIGS. 5 to 8 controls the satellite constellation 20 so as to avoid debris that intrudes into the satellite constellation 20, based on the intrusion alert 111 by the space object intrusion alert device 100.

As illustrated in FIGS. 5 to 8, the satellite constellation forming system 600 may be installed in the ground facility 700. In this case, the ground facility 700 controls an avoidance action for avoiding collisions between debris that intrudes into the satellite orbit area 301 and satellites constituting the satellite constellation 20, based on the intrusion alert 111 by the space object intrusion alert device 100.

With the satellite constellation forming system 600, the satellite constellation business operator can operate to avoid collisions without significantly disturbing the relative positional relationship among all satellites at least by a method such as accelerating or decelerating all the satellites at the same time. Therefore, the satellite constellation forming system 600 can avoid a collision with debris by the intrusion alert 111 according to this embodiment.

*Description of Effects of this Embodiment*

The space object intrusion alert device 100 according to this embodiment can notify an intrusion alert including a predicted time, predicted location coordinates, and predicted velocity vector information when it is determined that debris will intrude into a satellite constellation. The space object intrusion alert device 100 according to this embodiment can thus determine whether debris will intrude into an orbit area of a satellite constellation and notify an appropriate intrusion alert. A satellite constellation forming system or a ground facility that is notified of an intrusion alert according to this embodiment can take an appropriate avoidance action.

*Other Configurations* In this embodiment, the functions of the space object intrusion alert device 100 are realized by software. As a modification example, the functions of the space object intrusion alert device 100 may be realized by hardware.

Figure 15:
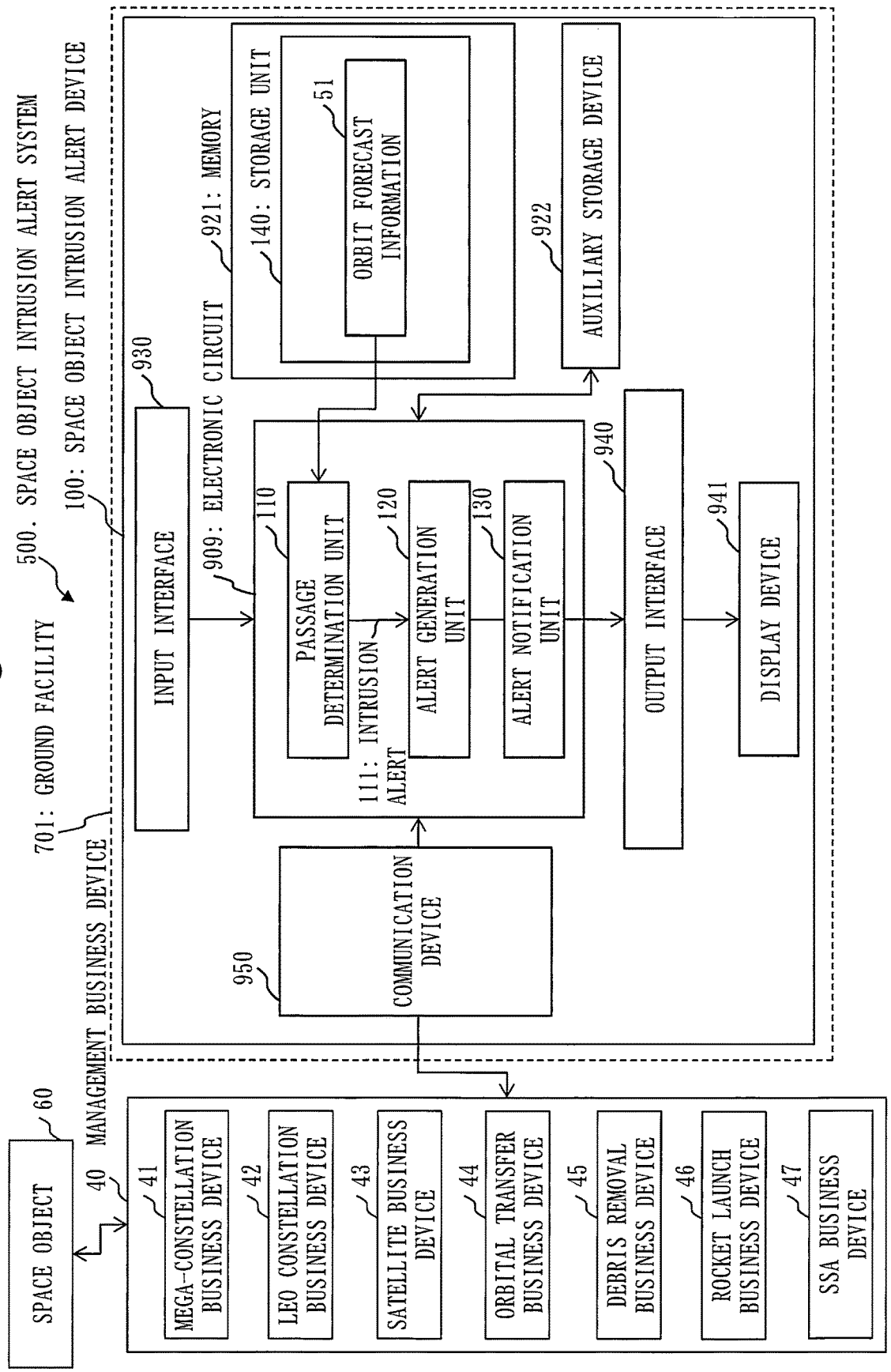
FIG. 15 is a configuration diagram of the space object intrusion alert device according to a modification example of Embodiment 1.

FIG. 15 is a diagram illustrating a configuration of the space object intrusion alert device 100 according to a modification example of this embodiment.

The space object intrusion alert device 100 includes an electronic circuit 909 in place of the processor 910.

The electronic circuit 909 is a dedicated electronic circuit that realizes the functions of the space object intrusion alert device 100.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the space object intrusion alert device 100 may be realized by one electronic circuit, or may be distributed among and realized by a plurality of electronic circuits.

As another modification example, some of the functions of the space object intrusion alert device 100 may be realized by the electronic circuit, and the rest of the functions may be realized by software.

Each of the processor and the electronic circuit is also called processing circuitry. That is, the functions of the space object intrusion alert device 100 are realized by the processing circuitry.

Embodiment 2

In this embodiment, differences from Embodiment 1 or additions to Embodiment 1 will be mainly described. In this embodiment, components that are substantially the same as those in Embodiment 1 will be denoted by the same reference signs and description thereof will be omitted.

*Description of Configurations*

In this embodiment, the configurations of the satellite constellation forming system 600 and the space object intrusion alert device 100 are substantially the same as those in Embodiment 1 described with reference to FIGS. 5 to 9.

In this embodiment, the satellite orbit area 301 includes an orbit at about sun-synchronous orbit local sun time (LST) 10:30 and at an altitude of about 500 km to 800 km. The alert notification unit 130 notifies the intrusion alert 111 to alert that debris will intrude into an orbit at about sun-synchronous orbit LST 10:30 and at an altitude of about 500 km to 800 km to the debris removal business device 45 used by the debris removal business operator that removes debris.

Figure 16:
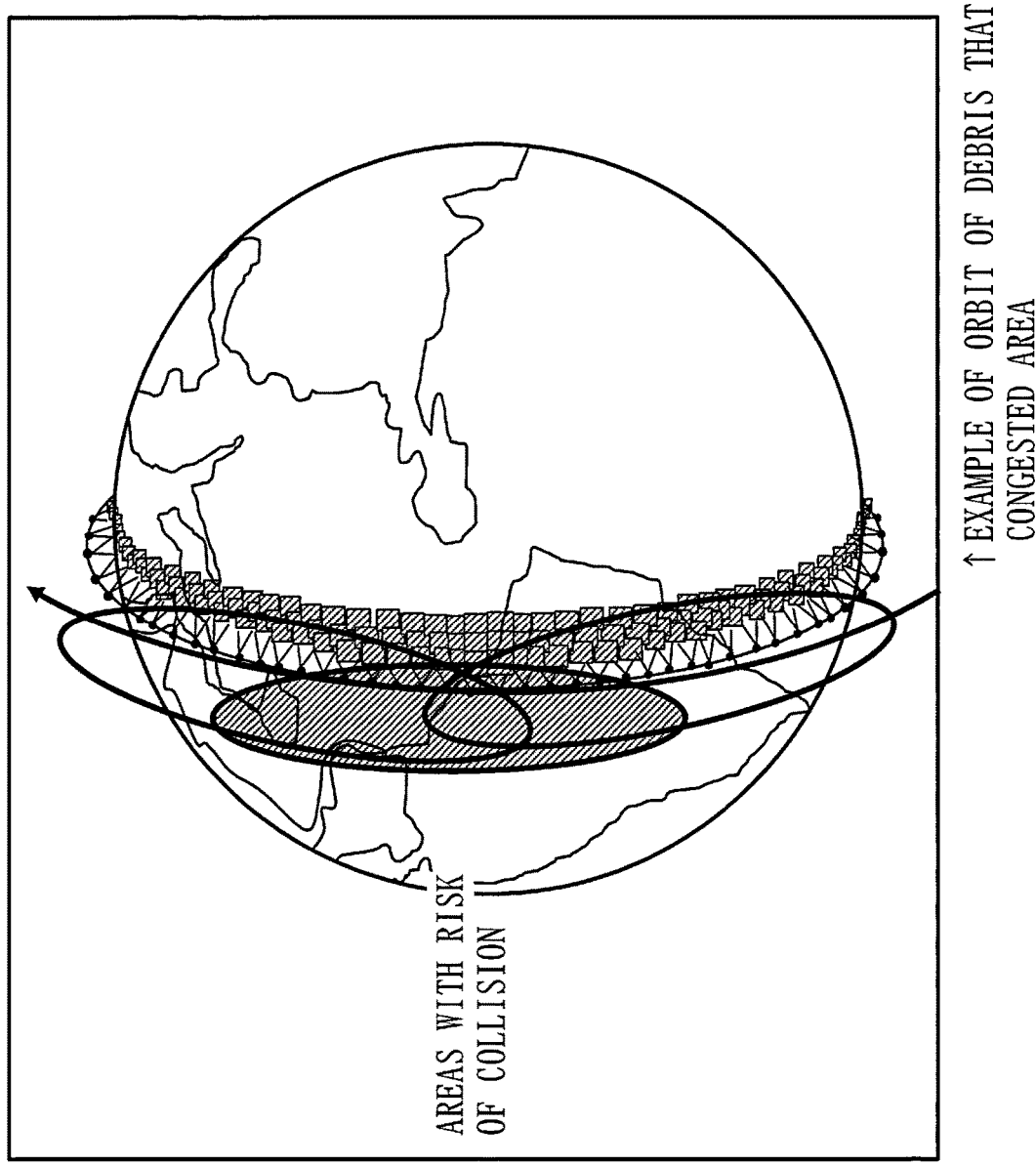
FIG. 16 is an example of an orbit of debris that intrudes into a satellite orbit area according to Embodiment 2.

FIG. 16 is a diagram illustrating an example of an orbit of debris that intrudes into the satellite orbit area 301 according to this embodiment.

Satellites of a large number of business operators of multiple counties are currently flying in the vicinity of sun-synchronous orbit LST 10:30 and at an orbital altitude of about 500 km to 800 km often used by Earth observation optical satellites. It is expected that in the future it will become a congested orbit where satellites of a large number of stakeholders operate as a string of closely located satellites. If debris intrudes into substantially the same plane as this congested orbital plane, a large number of satellites will become subjects of a proximity alert or a collision alert.

Furthermore, in this orbit, a satellite without means for autonomously taking an avoidance action, such as a small satellite called a CubeSat, cannot take an avoidance action even if a collision alert is issued. If there are both satellites that take an avoidance action and satellites that do not taken an avoidance action in a congested orbit, a secondary risk of collision such as a collision with a different satellite as a result of avoidance will arise. Thus, it is not always rational to take an avoidance action in the congested orbit.

When the predicted time of arrival of debris includes an error, it will translate into a large distance if the flight direction of satellites and the flight direction of the debris are close, and a large number of satellites will be exposed to a risk of collision.

Since it takes approximately 90 minutes to 100 minutes for a low Earth orbit satellite to complete one orbit, if there is uncertainty of about plus or minus 50 minutes in the arrival of debris, there will be a risk of collision for all satellites in the orbital plane concerned.

Furthermore, if a collision accident occurs in the congested orbit, a problem is that it is highly likely that a chain-reaction collision will occur.

Therefore, if prediction of an orbit of debris that will intrude into a congested orbit is found, it is rational to immediately issue an alert to a debris removal business operator so as to remove the debris.

Figure 17:
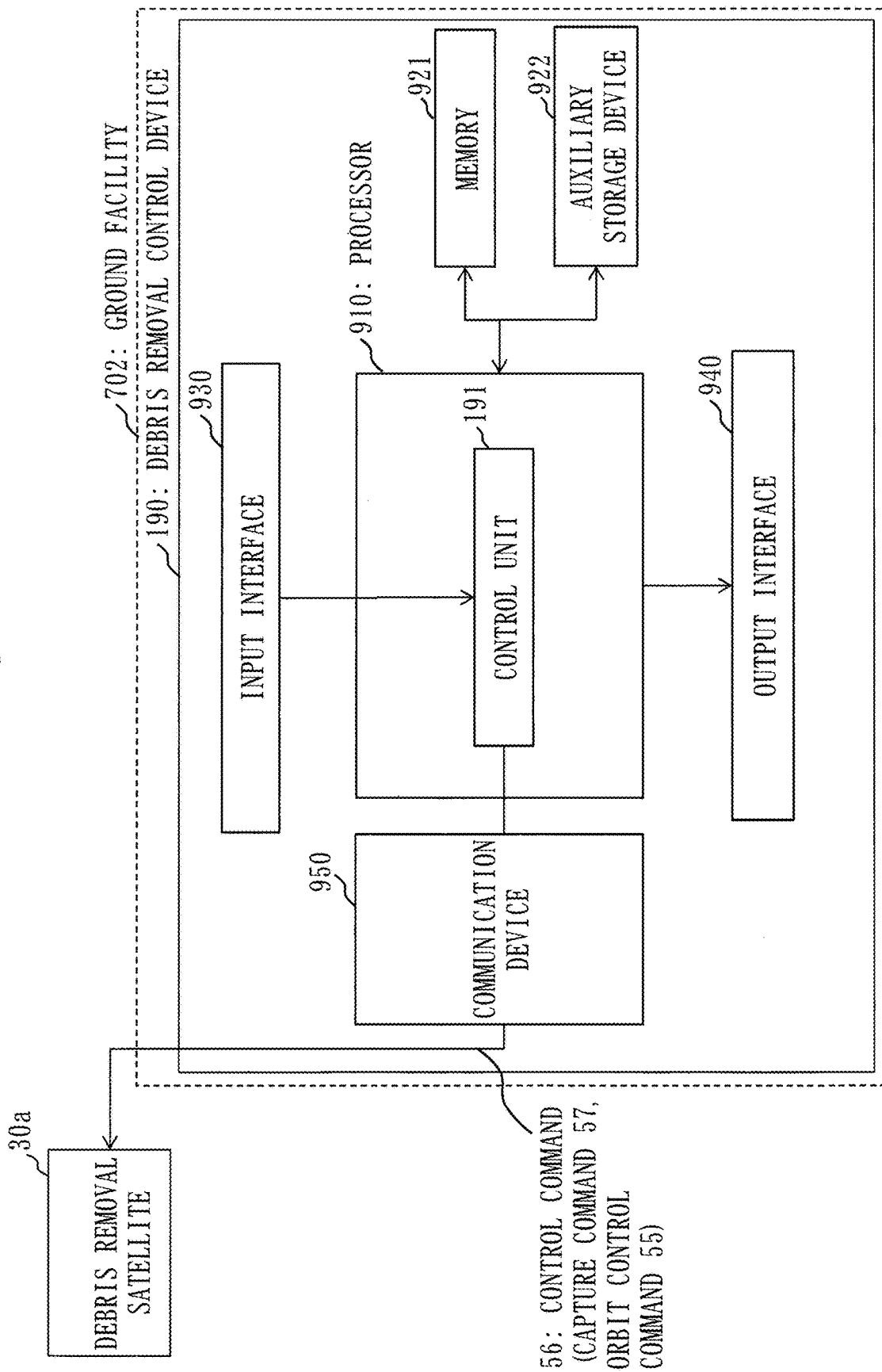
FIG. 17 is a configuration diagram of a debris removal control device according to Embodiment 2.

FIG. 17 is a diagram illustrating an example of a configuration of a debris removal control device 190 according to this embodiment.

Figure 18:
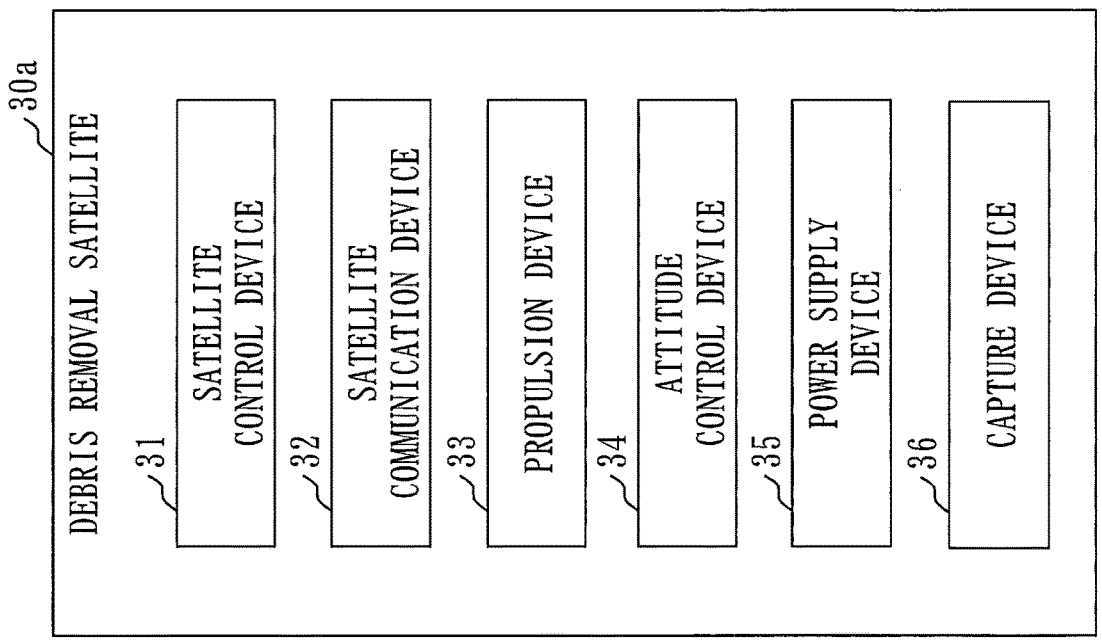
FIG. 18 is a configuration diagram of a debris removal satellite according to Embodiment 2.

FIG. 18 is a diagram illustrating an example of a configuration of a debris removal satellite 30*a* according to this embodiment.

The debris removal satellite 30*a* includes a capture device 36 to capture debris in addition to the components of the satellite 30 described with reference to FIGS. 5 to 8. Based on a control command 56 from the debris removal control device 190, the debris removal satellite 30*a* captures debris, and in a deorbit process until atmospheric entry, performs an active control operation during orbital descent so as to descend by avoiding areas with a high risk of collision with a space object. The active control operation during orbital descent is referred to also as an active deorbit operation.

The debris removal control device 190 may be installed in a ground facility 702. Alternatively, the debris removal control device 190 may be installed in the debris removal business device 45, or may be installed in another device that communicates with the debris removal business device 45.

A control unit 191 of the debris removal control device 190 generates the control command 56 to be transmitted to the debris removal satellite 30*a*. The control command 56 includes a capture command 57 and an orbit control command 55.

The control unit 191 generates the capture command 57 to capture debris with the capture device 36. The control unit 191 generates the orbit control command 55 to perform the active deorbit operation for the debris removal satellite 30*a* in a state after capturing the debris.

The debris removal satellite 30*a* captures the debris and performs the active deorbit operation, based on the control command 56.

The satellite orbit area 301 may include a high-latitude area including the polar region. The alert notification unit 130 notifies the intrusion alert 111 for alerting that debris will intrude into the high-latitude area including the polar region to the debris removal business device 45 used by the debris removal business operator that removes debris.

Figure 19:
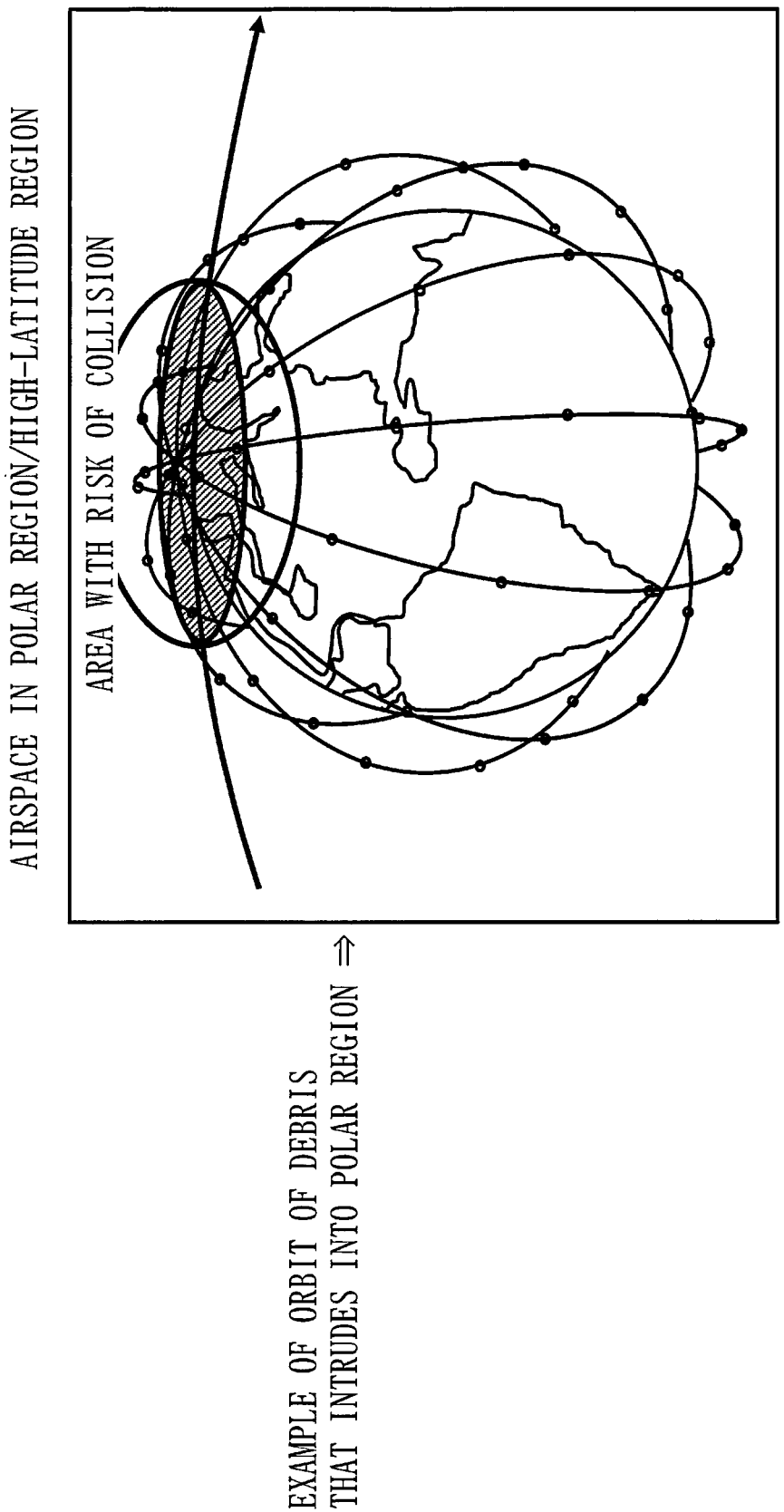
FIG. 19 is an example of an orbit of debris that intrudes into a satellite orbit area according to Embodiment 2.

FIG. 19 is a diagram illustrating an example of an orbit of debris that intrudes into the satellite orbit area 301 according to this embodiment.

In a constellation of polar orbit satellites, all orbital planes pass through the polar regions, so that the polar regions become congested areas.

If the debris arrival time includes a prediction error of plus or minus 50 minutes, a risk of collision may arise for all the satellites in all the orbital planes. Even if it is desirable to take an avoidance action, the avoidance action that a propulsion device included in a satellite can contribute to is typically no more than changing the orbital altitude, which may not be an effective risk avoidance measure, so that a situation may arise where it may be virtually difficult to take an avoidance action.

Therefore, if prediction of an orbit of debris that will intrude into airspace of a high-latitude region including the polar region is found, it is rational to immediately issue an alert to the debris removal business operator so as to remove the debris.

In Embodiment 1, an example of the intrusion alert to the satellite constellation business operator such as the mega-constellation business operator has been described. The intrusion alert to the satellite constellation business operator is similar, for example, to notification of an intrusion alert to a central management organization of a huge condominium when a suspicious person is found. In Embodiment 2, an example of the intrusion alert to the debris removal business operator has been described. The intrusion alert to the debris removal business operator is similar to notification of an intrusion alert to a security service organization.

The space object intrusion alert system may include a space information recorder to record space object information acquired from a management business device used by a management business operator that manages a plurality of space objects and may include a server. The space object intrusion alert system may include a database to store space object information acquired from the space information recorder. The server transmits an intrusion alert to the management business device, and assists avoidance of a collision with a space object.

Specifically, the server is the space object intrusion alert device. The database may be provided in the server, or may be a different device from the server. The server realizes the following phases (also referred to as means or units) with processing circuitry such as a processor or an electronic circuit.

Specifically, the database may be a memory, an auxiliary storage device, or a file server. The space information recorder records space object information acquired from a management business device used by a management business operator that manages a plurality of space objects. The space object intrusion alert device may include the space information recorder. The space information recorder may include orbit forecast information.

The server includes the following phases.

A phase of defining and registering a congested area where a large number of space objects fly.

A phase of identifying a space object A that is predicted to intrude into any part of the congested area from the space object information recorded in the space information recorder.

A phase of transmitting an intrusion alert to a management business device of the space object A.

A phase of transmitting an intrusion alert to a management business device that manages a space object that flies in the congested area.

The space object information includes a forecast epoch, a forecast orbital element, and a forecast error of a space object.

The congested area is, substantially, a range at an orbital altitude of 300 km to 1000 km in which there is a satellite group of sun-synchronous orbit LST 10:00 to 11:00.

The congested area is, substantially, a range at a latitude of 80 or more degrees north or a latitude of 80 or more degrees south and at an orbital altitude of 300 km to 1000 km in which a polar orbit satellite group flies.

The congested area includes an altitude range and a latitude range which are acquired from a management business device of a satellite group constituting a mega-constellation, and in which a constellation satellite group flying at the same nominal altitude and cooperatively realizing a single mission flies.

The server includes a phase of analyzing a forecast time period and forecast orbit information that are of a period from intrusion into and exit from the congested area by the space object A.

The server includes a phase of transmitting a forecast time period and forecast orbit information that are of a period from intrusion into and exit from the congested area by the space object A to the management business device of the space object A and the management business device of the space object that flies in the congested area.

The server includes a phase of transmitting an intrusion alert forecasting that the space object A will intrude into the congested area and a forecast time period and forecast orbit information that are of a period from intrusion into and exit from the congested area by the space object A to a management business device of a debris removal business operator that manages a debris removal satellite.

The server includes a phase of transmitting an intrusion alert forecasting that the space object A will intrude into the congested area and a forecast time period and forecast orbit information that are of a period from intrusion into and exit from the congested area by the space object A to a management business device of a space insurance business operator that operates space insurance.

A management business device of a mega-constellation business operator includes means for performing collision analysis based on space object information of a satellite group of a mega-constellation and space object information of the space object A.

The server includes a phase of, when a collision is foreseen by the collision analysis, transmitting an intrusion alert to the management business device of the mega-constellation business operator in a collision avoidance method in which a satellite in a mega-constellation avoids a collision.

The management business device of the debris removal business operator that has debris removal means performs a collision avoidance method of capturing the space object A with the debris removal means at a forecast orbit location before an intrusion forecast time so as to avoid intrusion, based on the space object information of the space object A. In the collision avoidance method, the server transmits an intrusion alert to the management business device of the debris removal business operator.

The space insurance business operator operates an insurance payment system in which damage caused by a collision between space objects is compensated with an insurance payment, using an insurance premium collected and saved in advance as a financial resource. The insurance payment system is a system in which a contract is started after a collision between space objects is foreseen. In the insurance payment system, the server transmits an intrusion alert to the management business device of the space insurance business operator.

The space object A is a rocket to be newly launched. Alternatively, the space object A is a geostationary satellite during orbital transfer or a quasi-zenith satellite. Alternatively, the space object A is a space object during orbital descent in a deorbit process.

In Embodiments 1 and 2 above, each unit of the space object intrusion alert device has been described as an independent block. However, the configuration of the space object intrusion alert device may be different from the configurations described in the above embodiments. The functional blocks of the space object intrusion alert device may be arranged in any configuration, provided that the functions described in the above embodiments can be realized. The space object intrusion alert device may a single device or a system composed of a plurality of devices.

Portions of Embodiments 1 and 2 may be implemented in combination. Alternatively, one portion of these embodiments may be implemented. These embodiments may be implemented as a whole or partially in any combination.

That is, in Embodiments 1 and 2, portions of Embodiments 1 and 2 may be freely combined, or any constituent element may be modified. Alternatively, in Embodiments 1 and 2, any constituent element may be omitted.

The embodiments described above are essentially preferable examples and are not intended to limit the scope of the present invention, the scope of applications of the present invention, and the scope of uses of the present invention. The embodiments described above can be modified in various ways as necessary.

REFERENCE SIGNS LIST

20: satellite constellation; 21: orbital plane; 30: satellite; 30a: debris removal satellite; 31: satellite control device; 32: satellite communication device; 33: propulsion device; 34: attitude control device; 35: power supply device; 36: capture device; 40: management business device; 41: mega-constellation business device; 42: LEO constellation business device; 43: satellite business device; 44: orbital transfer business device; 45: debris removal business device; 46: rocket launch business device; 47: SSA business device; 51: orbit forecast information; 52: satellite orbit forecast information; 53: debris orbit forecast information; 511: space object ID; 512: forecast epoch; 513: forecast orbital elements; 514: forecast error; 60: space object; 70: Earth; 100: space object intrusion alert device; 110: passage determination unit; 111: intrusion alert; 120: alert generation unit; 130: alert notification unit; 140: storage unit; 190: debris removal control device; 191: control unit; 55: orbit control command; 56: control command; 57: capture command; 301: satellite orbit area; 500: space object intrusion alert system; 600: satellite constellation forming system; 11, 11b: satellite constellation forming unit; 300: satellite group; 700, 701, 702: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device.

The invention claimed is:

1. A space object intrusion alert device comprising:
processing circuitry configured to:
determine whether debris is on a path that passes through a satellite constellation orbit, which is an orbit in which a plurality of satellites constituting a satellite constellation fly, based on satellite orbit forecast information in which a forecast value of an orbit of a satellite is set and debris orbit forecast information in which a forecast value of an orbit of the debris is set;
generate a first intrusion alert when it is determined that the debris is on the path that passes through the satellite constellation orbit, the first intrusion alert including a first predicted time, first predicted location coordinates, and first predicted velocity vector information that relate to passage of the debris; and
notify the first intrusion alert to a management business device used by a management business operator that manages a satellite that flies in the satellite orbit constellation.

2. The space object intrusion alert device according to claim 1,
wherein the processing circuitry notifies the first intrusion alert and the second intrusion alert to a satellite constellation business device used by a satellite constellation business operator that operates the satellite constellation.

3. The space object intrusion alert device according to claim 1,
wherein the satellite constellation orbit area is an orbit at about sun-synchronous orbit local sun time (LST) 10:30 and at an altitude of about 500 km to 800 km, and
wherein the processing circuitry notifies the first intrusion alert and the second intrusion alert to a debris removal business device used by a debris removal business operator that removes debris.

4. The space object intrusion alert device according to claim 1,
wherein the processing circuitry is further configured to determine whether the debris is on a path that passes through a satellite orbit area, which is a high-latitude area including a polar region, and
wherein the processing circuitry notifies the first intrusion alert and the second intrusion alert to a debris removal business device used by a debris removal business operator that removes debris.

5. A space object intrusion alert method comprising:
determining whether debris is on a path that passes through a satellite constellation orbit, which is an orbit in which a plurality of satellites constituting a satellite constellation fly, based on satellite orbit forecast information in which a forecast value of an orbit of a satellite is set and debris orbit forecast information in which a forecast value of an orbit of the debris is set;
generating a first intrusion alert when it is determined that the debris is on the path that passes through the satellite constellation orbit, the first intrusion alert including a first predicted time, first predicted location coordinates, and first predicted velocity vector information that relate to passage of the debris; and
notifying the first intrusion alert to a management business device used by a management business operator that manages a satellite that flies in the satellite orbit constellation.

6. A non-transitory computer readable medium storing a space object intrusion alert program that causes a computer to execute:
a passage determination process of determining whether debris is on a path that passes through a satellite constellation orbit, which is an orbit in which a plurality of satellites constituting a satellite constellation fly, based on satellite orbit forecast information in which a forecast value of an orbit of a satellite is set and debris orbit forecast information in which a forecast value of an orbit of the debris is set;
a first alert generation process of generating a first intrusion alert when it is determined that the debris is on the path that passes through the satellite constellation orbit, the first intrusion alert including a first predicted time, first predicted location coordinates, and first predicted velocity vector information that relate to passage of the debris; and
an alert notification process of notifying the first intrusion alert to a management business device used by a management business operator that manages a satellite that flies in the satellite orbit constellation.

7. A satellite constellation forming system to control the satellite constellation to avoid the debris that intrudes into the satellite constellation, based on the first intrusion alert by the space object intrusion alert device according to claim 1.

8. A debris removal satellite to remove the debris that intrudes into the satellite constellation orbit, based on the first intrusion alert by the space object intrusion alert device according to claim 3.

9. A ground facility to control an avoidance action to avoid a collision between the debris that intrudes into the satellite constellation orbit and a satellite in the satellite constellation, based on the first intrusion alert by the space object intrusion alert device according to claim 1.

10. A space object intrusion alert system comprising:
a space information recorder to record space object information acquired from a management business device used by a management business operator that manages a plurality of space objects; and a server,
wherein the server includes processing circuitry configured to
define and register a congested area where a large number of space objects fly;
identify a space object A that is predicted to intrude into any part of the congested area from the space object information recorded in the space information recorder;
transmit an intrusion alert to a management business device of the space object A; and
transmit an intrusion alert to a management business device that manages a space object that flies in the congested area.

11. The space object intrusion alert system according to claim 10,
wherein the space object information includes a forecast epoch, a forecast orbital element, and a forecast error of a space object.

12. The space object intrusion alert system according to claim 10,
wherein the congested area includes a range at an orbital altitude of 300 km to 1000 km in which there is a satellite group of sun-synchronous orbit local sun time (LST) 10:00 to 11:00.

13. The space object intrusion alert system according to claim 10,
wherein the congested area includes a range at a latitude of 80 or more degrees north or a latitude of 80 or more degrees south and at an orbital altitude of 300 km to 1000 km in which a polar orbit satellite group flies.

14. The space object intrusion alert system according to claim 10,
wherein the congested area includes an altitude range and a latitude range which are acquired from a management business device of a satellite group constituting a satellite constellation, and in which a constellation satellite group flying at a same nominal altitude and cooperatively realizing a single mission flies.

15. The space object intrusion alert system according to claim 10,
wherein the server includes a phase of analyzing a forecast time period and forecast orbit information that are of a period from intrusion into and exit from the congested area by the space object A.

16. The space object intrusion alert system according to claim 10,
wherein the server includes a phase of transmitting a forecast time period and forecast orbit information that are of a period from intrusion into and exit from the congested area by the space object A to the management business device of the space object A and the management business device of the space object that flies in the congested area.

17. The space object intrusion alert system according to claim 10,
wherein the server includes a phase of transmitting an intrusion alert forecasting that the space object A will intrude into the congested area and a forecast time period and forecast orbit information that are of a period from intrusion into and exit from the congested area by the space object A to a management business device of a debris removal business operator that manages a debris removal satellite.

18. The space object intrusion alert system according to claim 10,
wherein the server includes a phase of transmitting an intrusion alert forecasting that the space object A will intrude into the congested area and a forecast time period and forecast orbit information that are of a period from intrusion into and exit from the congested area by the space object A to a management business device of a space insurance business operator that operates space insurance.

19. The space object intrusion alert system according to claim 16,
wherein a management business device of a satellite constellation business operator includes processing circuitry to perform collision analysis based on space object information of a satellite group of a satellite constellation and space object information of the space object A, and
wherein the server includes a phase of, when a collision is foreseen by the collision analysis, transmitting an intrusion alert to the management business device of the satellite constellation business operator in a collision avoidance method in which a satellite in a satellite constellation avoids a collision.

20. The space object intrusion alert system according to claim 17,
wherein in a collision avoidance method in which based on the space object information of the space object A, the management business device of the debris removal business operator that has a debris removal satellite captures the space object A with the debris removal means at a forecast orbit location before an intrusion forecast time so as to avoid intrusion, the server includes a phase of transmitting an intrusion alert to the management business device of the debris removal business operator.

21. The space object intrusion alert system according to claim 18,
wherein in an insurance payment system in which damage caused by a collision between space objects is compensated with an insurance payment, using an insurance premium collected and saved in advance as a financial resource and in which a contract is started after a collision between space objects is foreseen, the server transmits an intrusion alert to the management business device of the space insurance business operator.

22. The space object intrusion alert system according to claim 10,
wherein the space object A is a rocket to be newly launched.

23. The space object intrusion alert system according to claim 10,
wherein the space object A is a geostationary satellite or a quasi-zenith satellite during orbital transfer.

24. The space object intrusion alert system according to claim 10,
wherein the space object A is a space object during orbital descent in a deorbit process.

25. The space object intrusion alert system according to claim 10, wherein the intrusion alert includes
a first intrusion alert including a first predicted time, first predicted location coordinates, and first predicted velocity vector information that relate to passage of the debris in a descending direction from outside the satellite constellation orbit to inside the satellite constellation orbit, and a second intrusion alert including a second predicted time, second predicted location coordinates, and second predicted velocity vector information that relate to passage of the debris in an ascending direction from inside the satellite constellation orbit to outside the satellite constellation orbit.

26. The space object intrusion alert system according to claim 10, wherein the congested area is a subset of possible orbits defined by at least one of an altitude range and a latitude range including the large number of space objects.

27. The space object intrusion alert device according to claim 1, wherein
the first predicted velocity information relates to the passage of the debris in a descending direction from outside the satellite constellation orbit to inside the satellite constellation orbit, and
the processing circuitry is further configured to:
generate a second intrusion alert when it is determined that the debris is on the path that passes through the satellite constellation orbit, the second intrusion alert including a second predicted time, second predicted location coordinates, and second predicted velocity vector information that relate to passage of the debris in an ascending direction from inside the satellite constellation orbit to outside the satellite constellation orbit; and
notify the second intrusion alert to the management business device.

28. The space object intrusion alert device according to claim 1, wherein the processing circuitry is further configured to determine whether the debris is on the path that passes through the satellite constellation orbit when it is determined that the debris is on a path that passes through at least one of an entrance where the debris enters an interior of the satellite constellation orbit or an exit where the debris exits an exterior of the satellite constellation orbit.

* * * * *